United States Patent
Shimomura et al.

(10) Patent No.: US 10,632,543 B2
(45) Date of Patent: Apr. 28, 2020

(54) VERTICAL LATHE

(71) Applicant: Kanzaki Kokyukoki Mfg. Co., Ltd., Hyogo (JP)

(72) Inventors: Yoshinobu Shimomura, Hyogo (JP); Masao Higaki, Hyogo (JP)

(73) Assignee: KANZAKI KOKYUKOKI MFG. CO., LTD., Hyogo (JP)

( * ) Notice: Subject to any disclaimer, the term of this patent is extended or adjusted under 35 U.S.C. 154(b) by 0 days.

(21) Appl. No.: 15/779,196

(22) PCT Filed: Nov. 4, 2016

(86) PCT No.: PCT/JP2016/082776
§ 371 (c)(1),
(2) Date: May 25, 2018

(87) PCT Pub. No.: WO2017/094439
PCT Pub. Date: Jun. 8, 2017

(65) Prior Publication Data
US 2018/0345384 A1    Dec. 6, 2018

(30) Foreign Application Priority Data

Nov. 30, 2015 (JP) ................................ 2015-232746

(51) Int. Cl.
*B23B 29/24* (2006.01)
*B23Q 39/02* (2006.01)
(Continued)

(52) U.S. Cl.
CPC ............ *B23B 29/242* (2013.01); *B23B 3/161* (2013.01); *B23B 7/12* (2013.01); *B23Q 1/48* (2013.01);
(Continued)

(58) Field of Classification Search
CPC ......... B23B 3/161; B23B 7/12; B23B 29/242; B23B 29/28; B23Q 39/027; B23Q 11/1023; B23Q 2039/004
See application file for complete search history.

(56) References Cited

U.S. PATENT DOCUMENTS

| | | | | |
|---|---|---|---|---|
| 4,006,518 A | * | 2/1977 | Rudolph | ................. B23B 3/161 29/39 |
| 4,213,354 A | * | 7/1980 | Dahinden | ............ B23Q 11/005 407/11 |

(Continued)

FOREIGN PATENT DOCUMENTS

| | | |
|---|---|---|
| CN | 1745939 A | 3/2006 |
| CN | 101500738 A | 8/2009 |

(Continued)

OTHER PUBLICATIONS

Written Opinion of the International Searching Authority for corresponding Application No. PCT/JP2016/082776; dated Jan. 24, 2017.

(Continued)

*Primary Examiner* — Alan Snyder
(74) *Attorney, Agent, or Firm* — Cantor Colburn LLP

(57) ABSTRACT

A vertical lathe, including: a headstock provided on the upper side of a base so as to be capable of moving in the lateral direction and the vertical direction; a main spindle rotatably supported by the headstock; a workpiece chuck provided at the lower end section of the main spindle; a turret support stand provided so as to be capable of moving in the longitudinal direction orthogonal to the lateral direction and the vertical direction; an actuator for moving the turret support stand in the longitudinal direction; a turret having tool mounting parts provided at a plurality of circumferential positions, the turret being supported by the turret support stand so as to enable turn-indexing about the (Continued)

axis in the longitudinal direction; and a plurality of processing tools attached at each of the tool mounting parts so as to be set apart from each other in the longitudinal direction.

6 Claims, 21 Drawing Sheets

(51) Int. Cl.
    *B23B 7/12*     (2006.01)
    *B23Q 1/48*     (2006.01)
    *B23B 3/16*     (2006.01)
    *B23Q 11/10*     (2006.01)
    *B23Q 39/00*     (2006.01)

(52) U.S. Cl.
    CPC ........ *B23Q 39/027* (2013.01); *B23Q 11/1023* (2013.01); *B23Q 2039/004* (2013.01)

(56) References Cited

U.S. PATENT DOCUMENTS

| | | | |
|---|---|---|---|
| 6,021,695 A * | 2/2000 | Kosho | B23B 3/06 29/35.5 |
| 8,297,158 B2 * | 10/2012 | Watanabe | B23B 3/165 29/27 R |
| 2004/0237542 A1 * | 12/2004 | Zurecki | B23Q 1/0018 62/50.7 |
| 2006/0048614 A1 | 3/2006 | Lange et al. | |
| 2009/0308214 A1 | 12/2009 | Watanabe et al. | |
| 2015/0306673 A1 | 10/2015 | Akai et al. | |

FOREIGN PATENT DOCUMENTS

| | | | |
|---|---|---|---|
| CN | 102847956 A | 1/2013 | |
| CN | 204603323 U | 9/2015 | |
| JP | 51093483 A | 8/1976 | |
| JP | 04193452 A | 7/1992 | |
| JP | 06036749 U | 5/1994 | |
| JP | 08025109 A | 1/1996 | |
| JP | H10138001 A | 5/1998 | |
| JP | 2007118182 A | 5/2007 | |
| JP | 2010253591 A | 11/2010 | |
| WO | 2008016076 A1 | 2/2008 | |
| WO | WO-2016021212 A1 * | 2/2016 | ........... B23Q 39/022 |

OTHER PUBLICATIONS

Transmission of International Preliminary Report on Patentability for corresponding to Application No. PCT/JP2016/082776; dated Jun. 5, 2018.
International Search Report and Written Opinion for PCT application PCT/JP2016/082776; dated Jan. 24, 2017.
JPO Notice of Grounds for Rejection corresponding to Application No. JP2015-232746; dated Jul. 23, 2019.
CN Office Action Corresponding to CN 201680069857.6; dated Jul. 31, 2019.

* cited by examiner

← (FRONT SIDE)   (REAR SIDE) →

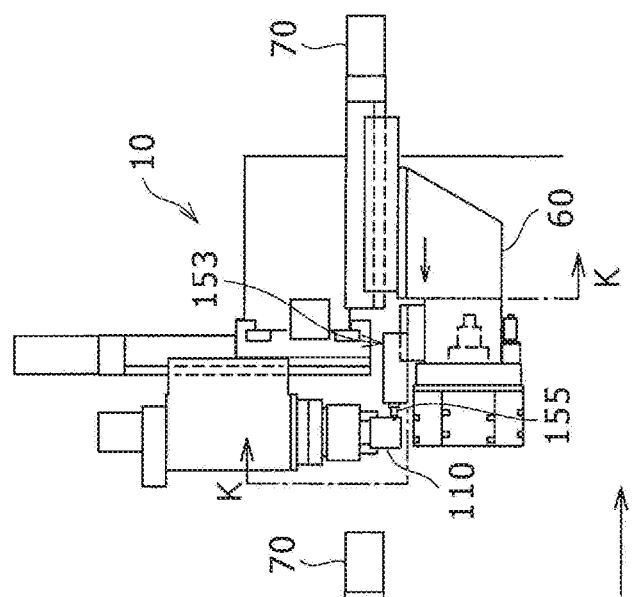
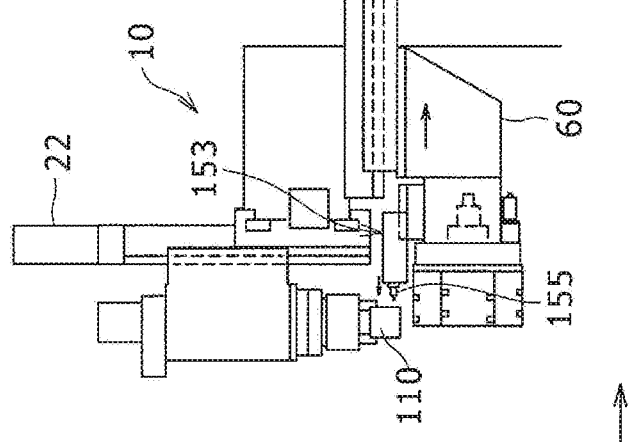
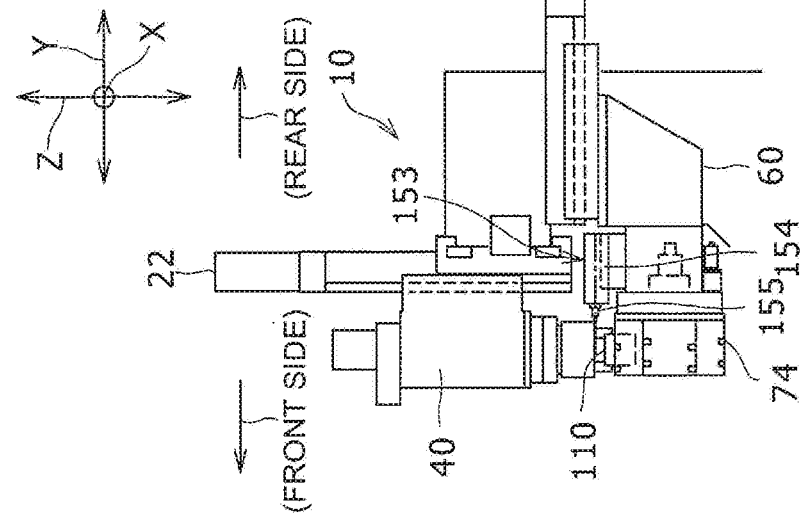

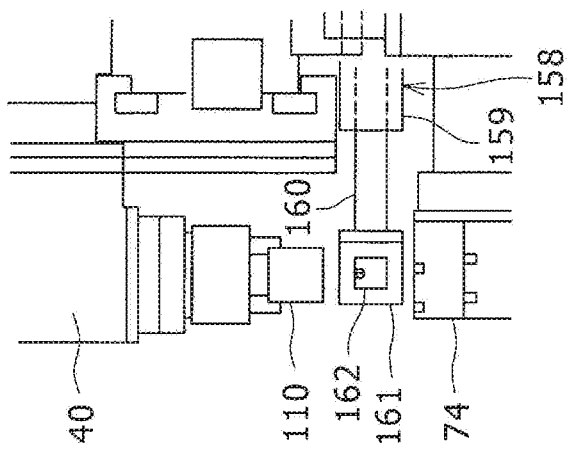
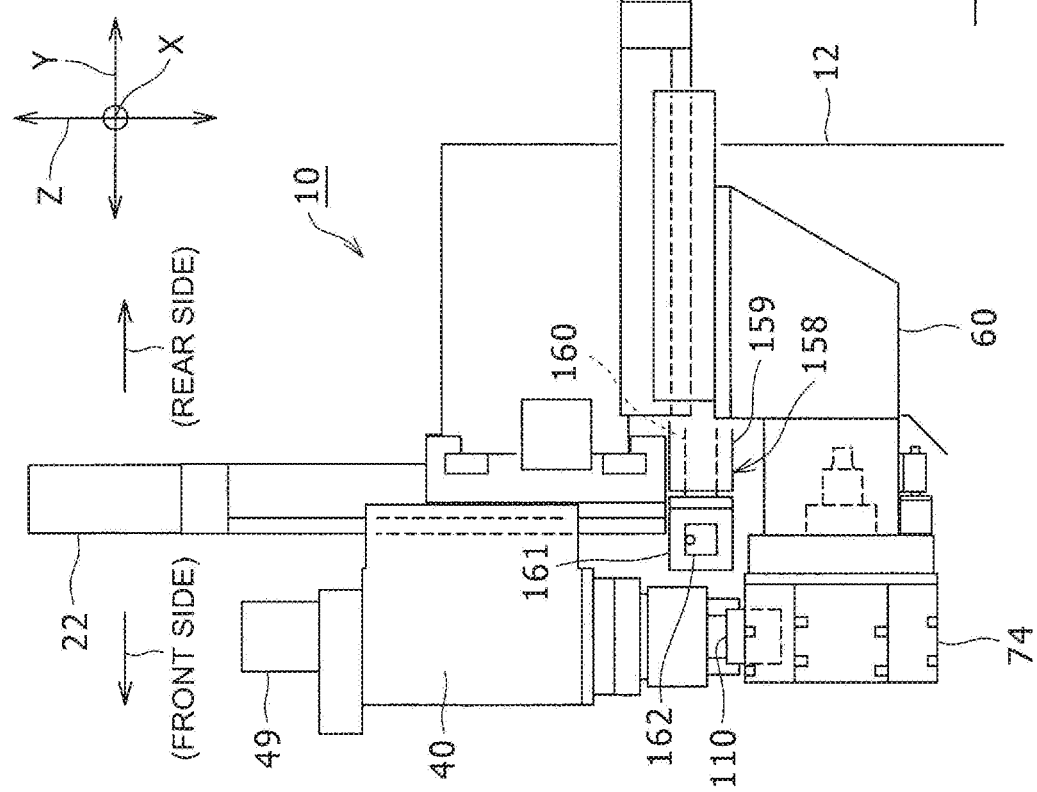

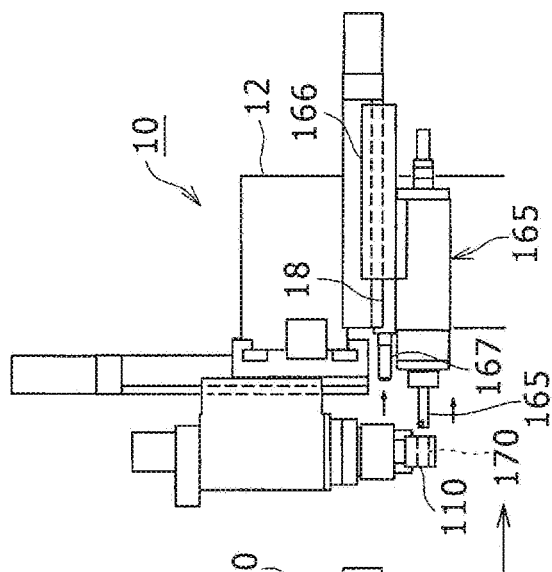
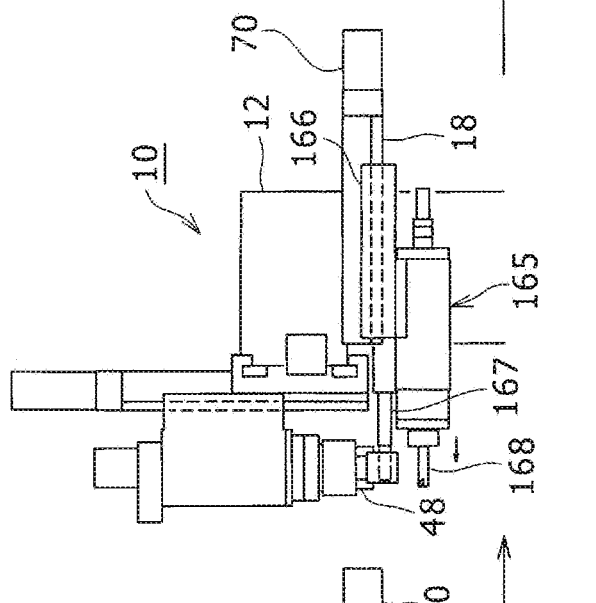
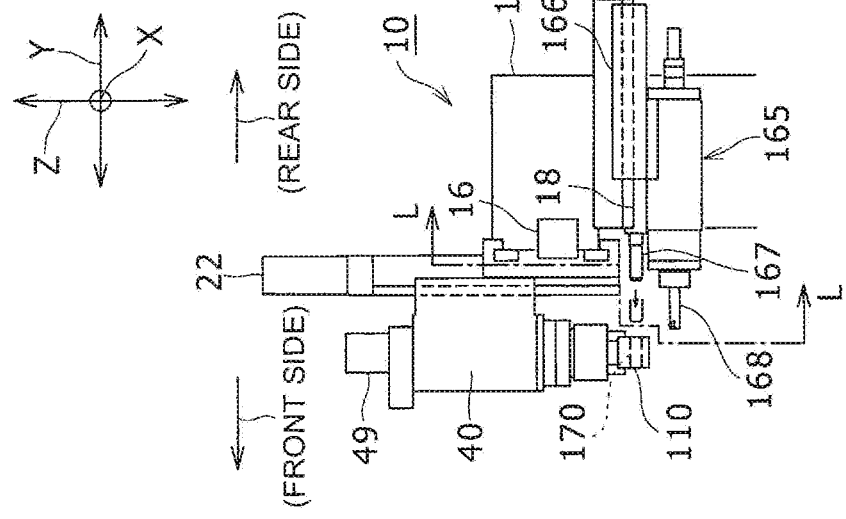

VERTICAL LATHE

CROSS REFERENCE TO RELATED APPLICATIONS

This is the U.S. national stage of application No. PCT/JP2016/082776, filed on Nov. 4, 2016. Priority under 35 U.S.C. § 119(a) and 35 U.S.C. § 365(b) is claimed from Japanese Application No. 2015-232749, filed on Nov. 30, 2015, the disclosures all of which are also incorporated herein by reference.

TECHNICAL FIELD

The present disclosure relates to a vertical lathe which includes a vertically movable headstock, a main spindle supported by the headstock, a workpiece chuck disposed on the main spindle, a rotatably indexable turret, and machining tools attached to the turret.

BACKGROUND

A vertical lathe is a lathe in which a main spindle supported by a headstock has a vertical axis. In a state where a workpiece is held by a workpiece chuck disposed on the main spindle, the workpiece is machined by machining tools while the main spindle or the machining tools which is below the main spindle are rotatably driven such that the main spindle is relatively moved with respect to the machining tools.

Patent Literature 1 discloses a vertical lathe in which a rotational turret is disposed below a main spindle. Machining tools of various types such as end mills and drills are disposed apart from each other in a circumferential direction of the turret. The turret is rotated to direct a desired machining tool towards a workpiece.

Patent Literature 2 discloses a vertical lathe which includes a rotational turret below a main spindle. Machining tools are attached to the turret. This vertical lathe further includes a movable platform which is movable in an X-axis direction with respect to a bed. The main spindle is disposed to be movable in a Z-axis direction of the movable platform. The main spindle which is embedded in the headstock is rotatably driven by a motor.

Patent Literature 3 discloses a cutting tool which is secured on a tool post of a machine tool. The cutting tool includes an oil agent supply passage disposed in a longitudinal direction of a shank which has a shape of a substantially square column. An oil agent supply unit is connected to an opening end of the supply passage at a rear end of the shank. An extending portion extending towards the tip of a cutting edge is disposed at the tip of the shank. The extending portion communicates with the supply passage to eject the cutting oil agent towards the cutting edge.

CITATION LIST

Patent Literature

Patent Literature 1: JP 2007-118182A
Patent Literature 2: JP 3802627B
Patent Literature 3: JP H08-25109A

SUMMARY

Technical Problem

In vertical lathes, when a blade of a currently-used machining tool attached to a turret becomes unusable due to a broken blade, the currently-used machining tool needs to be replaced with a new one. If a plurality of machining tools of the same type are disposed at some positions on the turret in a circumferential direction, the machining tool can be replaced with a new one by rotating the turret without stopping the machine. However, in order to enhance performance, it is desired to further improve maintainability.

For conventional vertical lathes, it is also desired to enhance performance by achieving a structure allowing a single machine to machine a workpiece which needs to be machined in various machining processes by machining tools of wider variety.

An object of the present disclosure is to provide a vertical lathe which can enhance performance.

Solution to Problem

A vertical lathe according to the present disclosure includes a base, a headstock disposed above the base to be movable in a lateral direction and a vertical direction, and a main spindle that is rotatably supported about an axis in a vertical direction with respect to the head stock. The vertical lathe also includes a workpiece chuck that is disposed at a lower end portion of the main spindle such that the workpiece chuck detachably holds a workpiece, a main spindle drive motor that rotatably drives the main spindle, and a turret carriage that is disposed to be movable with respect to the base in a front/back direction that is perpendicular to the lateral direction and the vertical direction. The vertical lathe further includes an actuator secured on the base to move the turret carriage in the front/back direction, a turret that includes a plurality of tool mounting portions disposed at a plurality of positions in a circumferential direction, the turret being supported by the turret carriage to be rotatably indexable about an axis in the front/back direction, and a plurality of machining tools that are attached apart from each other in the front/back direction at the a plurality of tool mounting portions.

Advantageous Effects of Invention

A vertical lathe according to the present disclosure can enhance performance by using an actuator to move a turret in a front/back direction so as to replace a machining tool with another one for performing a machining operation.

BRIEF DESCRIPTION OF DRAWINGS

FIG. 15A to FIG. 15C are diagrams showing drilling processes of a vertical lathe according to another embodiment of the present disclosure, in which, in a structure to which a tool for drilling a workpiece is added, drilling is applied after machining of an outer circumferential surface of the workpiece;

FIG. 18A and FIG. 18B are diagrams showing oval machining processes to an outer cylindrical circumferential surface of a workpiece after groove finishing of the workpiece in the structure shown in FIG. 17;

FIG. 20A to FIG. 20C are diagrams showing positioning processes of a vertical lathe according to another embodiment of the present disclosure in a structure to which a pin hole machining unit to finish a pin hole of a workpiece is added in place of a turret.

DESCRIPTION OF EMBODIMENTS

Figure 1A:
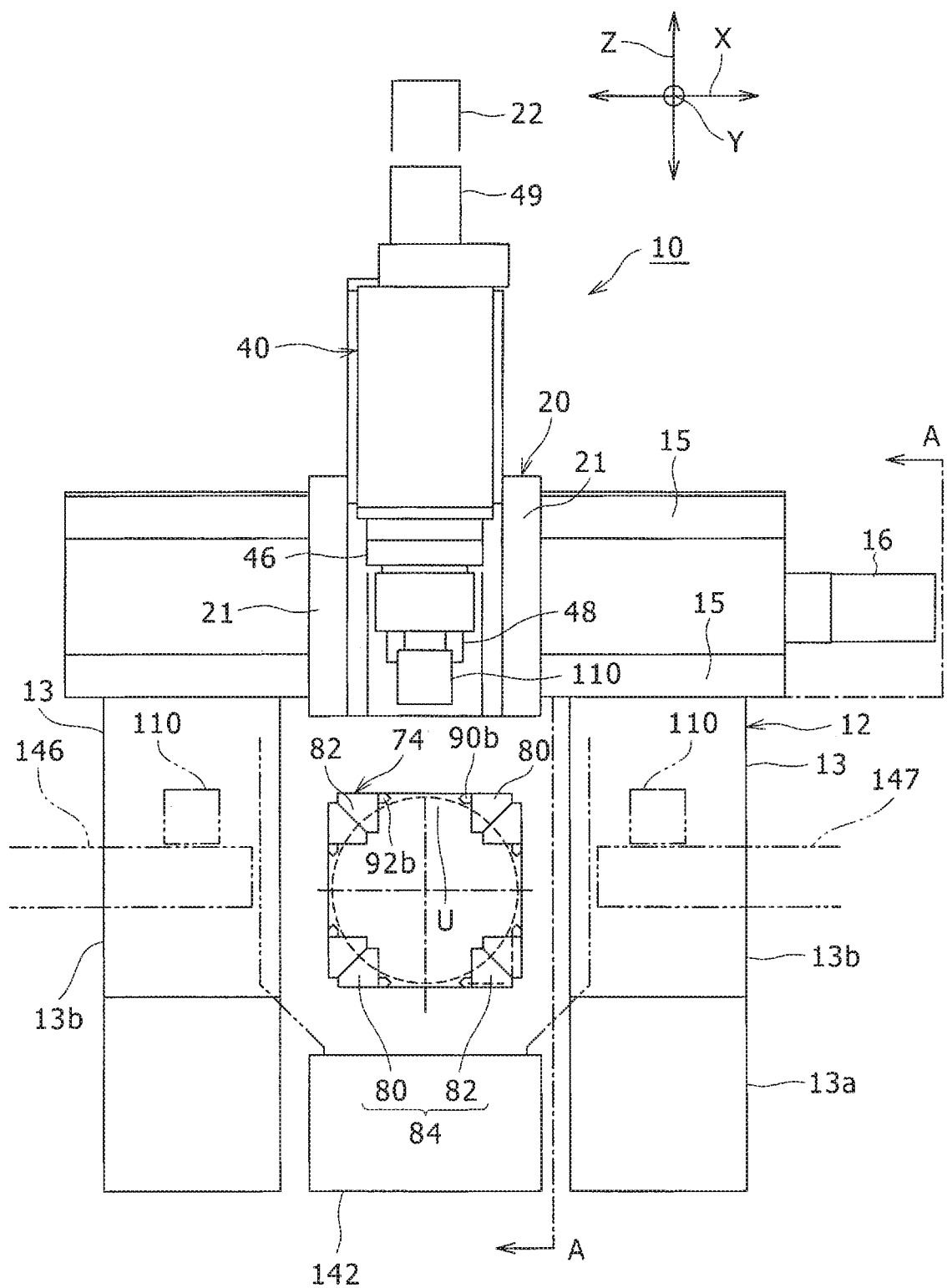
FIG. 1A is a front view of a vertical lathe according to an embodiment of the present disclosure.

Embodiments according to the present disclosure are described below by reference to the drawings. In the description below, when a plurality of embodiments or examples are available, it is assumed from the start that features of elements in these embodiments or examples are appropriately combined for use. Specifics such as shapes, numbers and amounts, and materials described below are merely examples for clarity, and thus can be appropriately changed in accordance with the specifications of each vertical lathe. In the description below, the same reference numerals as previously denoted are used as necessary.

Figure 1B:
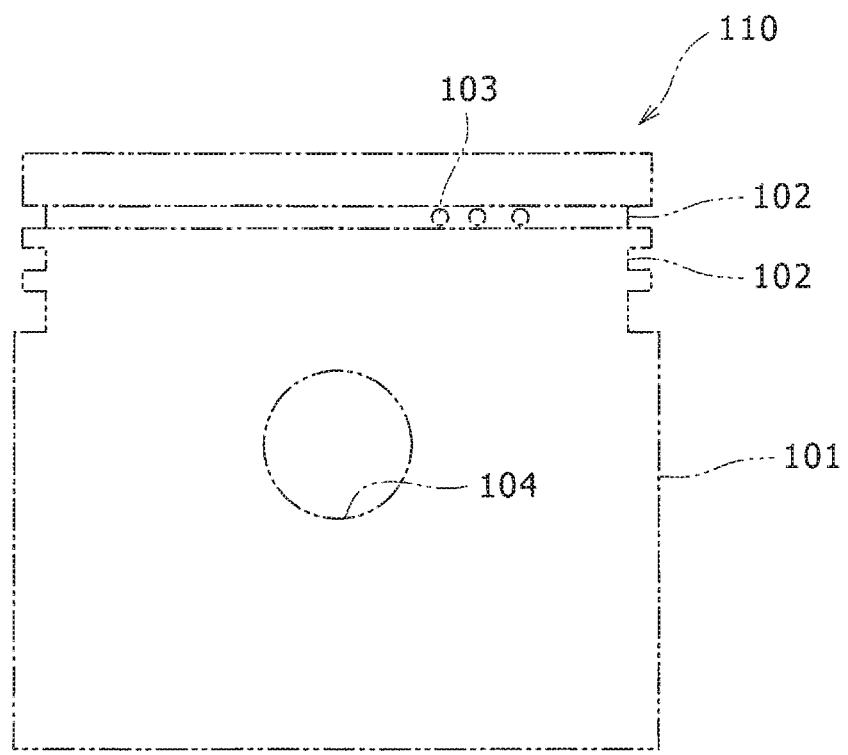
FIG. 1B is a diagram showing a workpiece which is partially machined by a vertical lathe.
Figure 2:
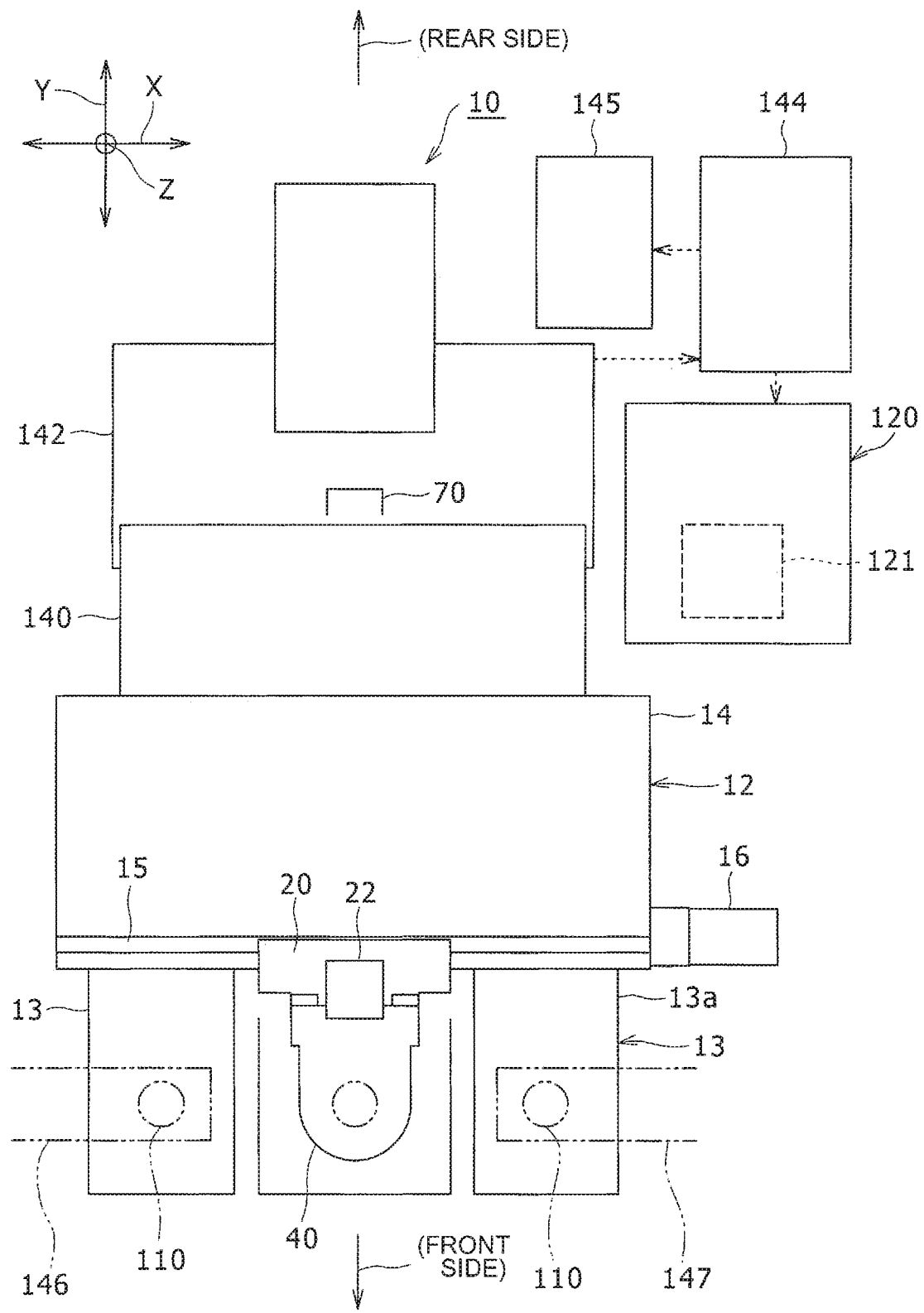
FIG. 2 is a top view of FIG. 1A.
Figure 3A:
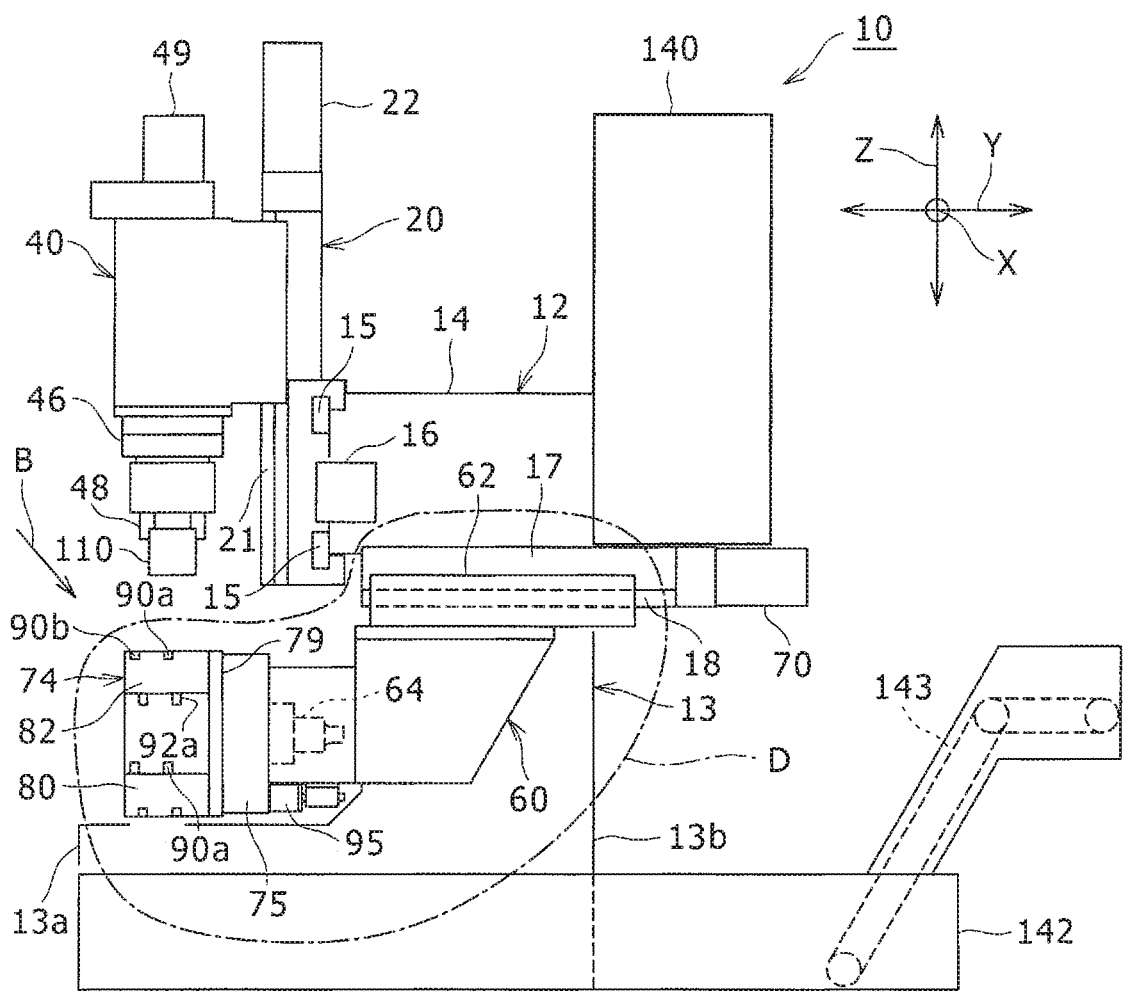
FIG. 3A is a cross-sectional view taken along the line A-A in FIG. 1A.
Figure 3B:
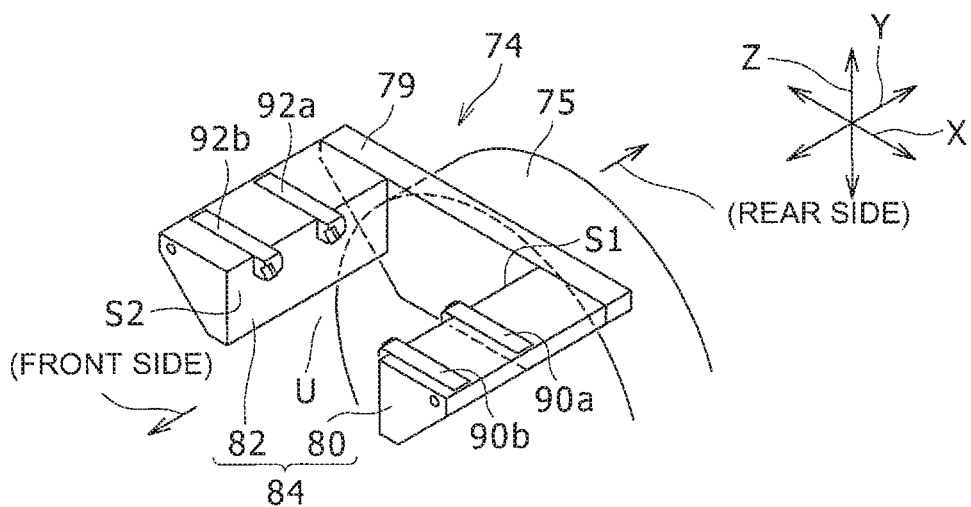
FIG. 3B is a perspective diagram of a turret viewing in a direction shown with an arrow B in FIG. 3A with some portions omitted.
Figure 4:
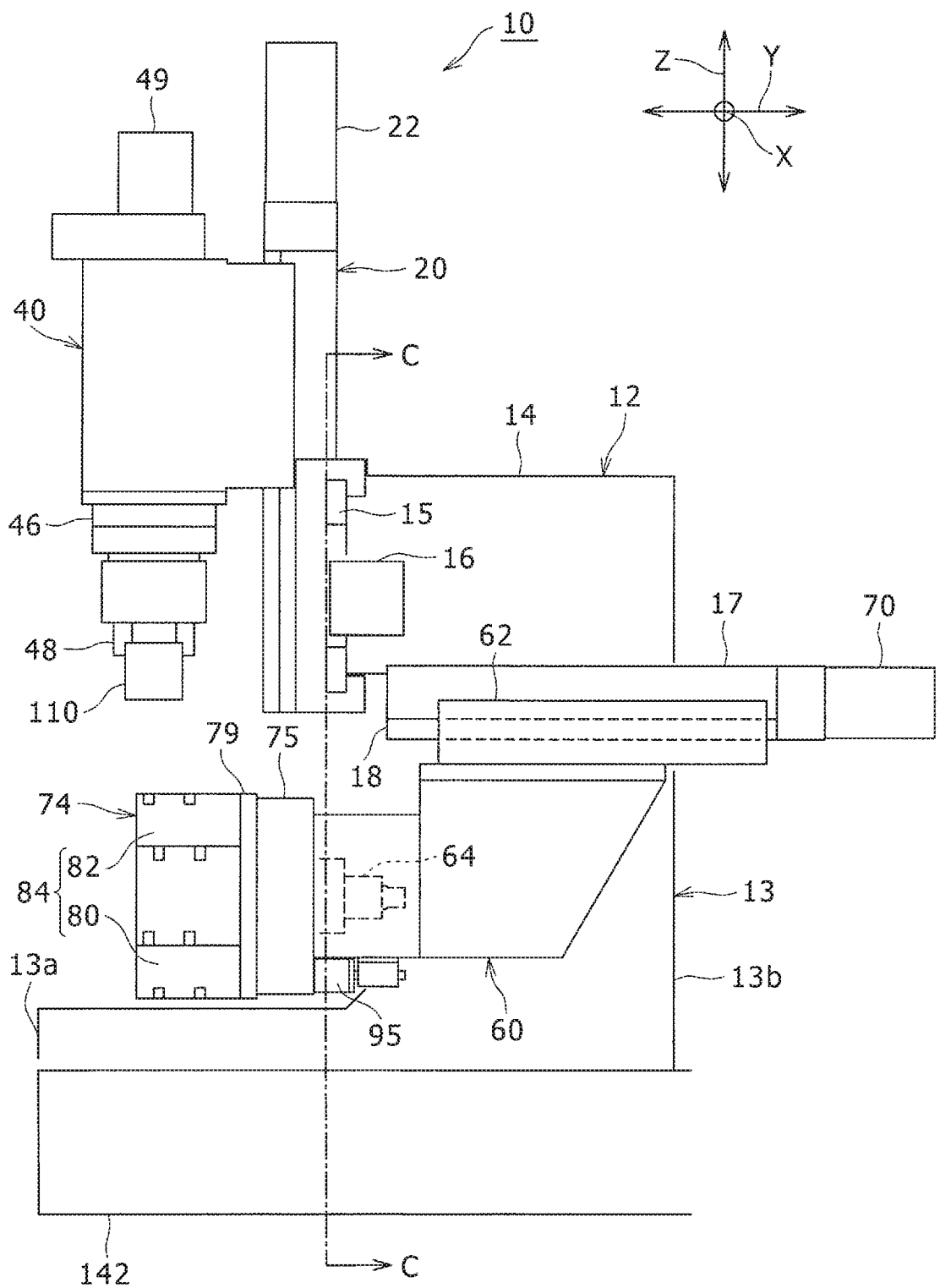
FIG. 4 is a diagram showing machining tools below a main spindle at a position shifted from FIG. 3A in the front/back direction.
Figure 5:
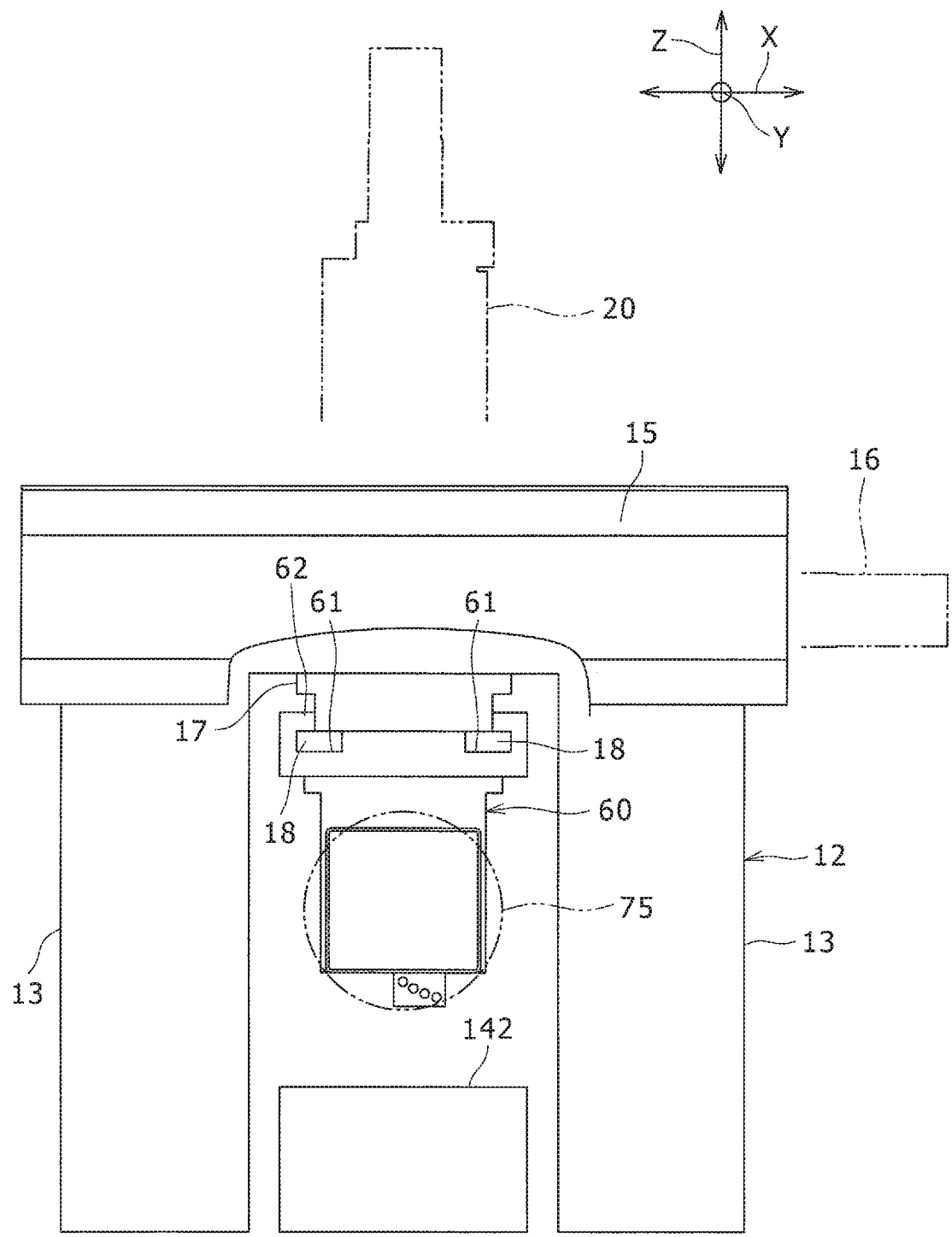
FIG. 5 is a cross-sectional view taken along the line C-C in FIG. 4.

FIG. 1A is a front view of a vertical lathe 10 according to an embodiment. FIG. 1B is a diagram showing a workpiece 110 which is partially machined by the vertical lathe 10. FIG. 2 is a top view of FIG. 1A. FIG. 3A is a cross-sectional view taken along the line A-A in FIG. 1A. FIG. 3B is a perspective diagram of a turret viewing in the direction shown with an arrow B in FIG. 3A with some portions omitted. FIG. 4 is a diagram showing machining tools below a main spindle at a position shifted from FIG. 3 in the front/back direction. FIG. 5 is a cross-sectional view taken along the line C-C in FIG. 4.

The vertical lathe 10 includes a base 12, a laterally movable member 20, a headstock 40, a main spindle 46, a workpiece chuck 48, a main spindle drive motor 49, a turret carriage 60 (FIG. 3A), a forward/backward movement motor 70 (FIG. 3A), and a turret 74. The vertical lathe 10 further includes a plurality of first machining tools 90a, 90b and a plurality of second machining tools 92a, 92b. In FIG. 1A and FIG. 2 to FIG. 5, the lateral direction extending in a horizontal right/left direction in the front view in FIG. 1A is denoted by X. The front/back direction extending in a horizontal right/left direction in FIG. 3A perpendicular to the direction X is denoted by Y. The vertical direction perpendicular to the directions X and Y is denoted by Z. In description below, of the sides of the vertical lathe 10, the side on which the headstock 40 described below is disposed (the left side in FIG. 3A) with respect to the base 12 described below is assumed to be the front side and the side opposite to the headstock 40 (the right side in FIG. 3A) is assumed to be the rear side. The left side and the right side are determined when viewed from the front side to the rear side as shown in FIG. 1A. The positions and moving directions described below may be reversed in the front/back and lateral directions of each portion.

As shown in FIG. 1B, the workpiece 110 which is machined by the vertical lathe 10 according to the present disclosure has a cylindrical portion 101 including a closed top end and a plurality of annular grooves 102 on an upper outer circumferential surface. The annular grooves 102 include, on a bottom portion, a plurality of small holes 103 in a circumferential direction. The small holes 103 are through holes penetrating from the outer circumferential surface to the inner circumferential surface. The cylindrical portion 101 includes two pin holes 104 respectively disposed at opposing positions (180 degree difference) in the circumferential direction in a lower portion of the cylindrical portion 101. A pin (not shown) is insertable through each of the pin holes 104. Oval machining may be applied to the outer circumferential surface of the cylindrical portion 101 to machine the cylindrical portion 101 to have an oval cross section.

As shown in FIG. 1A, FIG. 2, and FIG. 3A, the base 12 has a gate shape including two leg potions 13 disposed apart from each other in the lateral direction X and an upper supporting portion 14 connecting top portions of the two leg potions 13 in the lateral direction X. Each leg potion 13 includes a lower end portion 13a which extends in the front/back direction Y and a column portion 13b which is uprightly disposed from the back end of the lower end portion 13a (the right end portion in FIG. 3A).

The upper supporting portion 14 extends in the lateral direction X. Two first guide rails 15 are secured on a front end surface of the upper supporting portion 14 (the left side in FIG. 3A) such that the first guide rails 15 are disposed apart from each other in the vertical direction Z. Each of the first guide rails 15 extends in the lateral direction X. A lateral movement motor 16 is secured to the right end portion of the upper supporting portion 14 in the lateral direction X. The lateral movement motor 16 is an electric motor which moves the laterally movable member 20 described below in the lateral direction X.

The laterally movable member 20 is disposed at a front portion of the upper supporting portion 14 such that the lower end of the laterally movable member 20 is supported by the two first guide rails 15 to be movable in the lateral direction X. The laterally movable member 20 is moved in the lateral direction X by a first feed screw mechanism (not shown). Specifically, the first feed screw mechanism includes a nut member secured on the laterally movable member 20 and a screw thread which engages the nut member. The screw thread is coupled with the rotational shaft of the lateral movement motor 16. The laterally movable member 20 moves in the lateral direction X by the rotation of the lateral movement motor 16 causing the nut member to move in the lateral direction X.

Two second guide rails 21 are secured on a front end portion of the laterally movable member 20 such that the two second guide rails 21 are disposed apart from each other in the lateral direction X. Each of the second guide rails 21 extends in the vertical direction Z. A lifting/lowering motor 22 is secured on an upper end portion of laterally movable member 20. The lifting/lowering motor 22 is an electric motor which moves the headstock 40 described below in the vertical direction Z.

The headstock 40 rotatably supports the main spindle 46 on the inside. The headstock 40 is supported by the two second guide rails 21 to be movable in the vertical direction Z. The headstock 40 is moved in the vertical direction Z by a second feed screw mechanism (not shown). Specifically, the second feed screw mechanism includes a nut member secured to the headstock 40 and a screw thread which engages the nut member. The screw thread is coupled with a rotation shaft of the lifting/lowering motor 22. The headstock 40 is lifted or lowered by the rotation of the lifting/lowering motor 22 causing the nut member to move in the vertical direction Z. In this way, the headstock 40 is disposed on the upper side of the base 12 such that the headstock 40 is movable both in the lateral direction X and the vertical direction Z. The main spindle drive motor 49 is secured on the upper end portion of the headstock 40.

The main spindle 46 is rotatably supported about an axis in the vertical direction Z with respect to the headstock 40 such that the lower end portion of the main spindle 46 protrudes downward from the headstock 40. The workpiece chuck 48 is disposed at the lower end portion of the main spindle 46 and configured to detachably hold the workpiece 110. A rotation shaft of the main spindle drive motor 49 is secured to the main spindle 46. In this way, the main spindle 46 is rotatably driven about an axis in the vertical direction Z by the rotation of the main spindle drive motor 49.

As shown in FIG. 4 and FIG. 5, a rail supporting portion 17 is secured at the lower end portion of the upper supporting portion 14 of the base 12 at the center in the lateral direction X. Two third guide rails 18 are secured at the lower end portions of the rail supporting portion 17 such that the third guide rails 18 are disposed apart from each other in the lateral direction X. Each of the third guide rails 18 extends in the front/back direction Y. The third guide rails 18 protrudes outward from the side surfaces of the rail supporting portion 17 in the lateral direction X. The forward/backward movement motor 70, which is an electric motor, is secured at the rear end portion of the rail supporting portion 17. The forward/backward movement motor 70 corresponds to an actuator.

The turret carriage 60 is suspended below the two third guide rails 18 such that the turret carriage 60 is supported by the third guide rails 18 to be movable in the front/back direction Y. Specifically, two engaging grooves 61 are formed at an upper end portion of the turret carriage 60 such that the two engaging grooves 61 are formed apart from each other in the lateral direction X. The engaging grooves 61 respectively engage the third guide rails 18. Hook portions 62 formed at the upper portions of the turret carriage 60 on both ends in the lateral direction X engage the outwardly protruding portions of the third guide rails 18 on both ends in the lateral direction X.

The turret carriage 60 is moved in the front/back direction Y by a third feed screw mechanism (not shown). Specifically, the third feed screw mechanism includes a nut member secured on the turret carriage 60 and a screw thread which engages the nut member. The screw thread is coupled with a rotation shaft of the forward/backward movement motor 70. The turret carriage 60 moves in the front/back direction by the rotation of the forward/backward movement motor 70 causing the nut member to move in the front/back direction Y. In this way, the forward/backward movement motor 70 moves the turret carriage 60 in the front/back direction Y.

Each of the first feed mechanism, the second feed mechanism, and the third feed mechanism may be a ball screw mechanism in which a screw thread and a nut member engage with each other via a plurality of balls.

The turret carriage 60 has a flat front surface which is perpendicular to an axis in the front/back direction Y. The turret 74 is disposed facing this flat surface. The turret 74 is rotatably supported about the axis in the front/back direction Y. An indexing motor 64 is secured in a hole portion formed at the center of the front surface of the turret carriage 60. A rotation shaft (not shown) of the indexing motor 64 is secured to a rear portion (right end portion in FIG. 4 and FIG. 6) of the turret 74. The indexing motor 64 rotatably drives the turret 74 in 90 degree increments about the axis in the front/back direction Y.

As described below, a plurality of pairs of first machining tools 90a, 90b and a plurality of pairs of second machining tools 92a, 92b are attached to the turret 74. For example, a plurality of pairs of the first machining tools 90a, 90b of the same type are disposed at a plurality of positions in the circumferential direction of the turret 74 such that the two first machining tools 90a, 90b are disposed apart from each other in the front/back direction Y. A plurality of pairs of the second machining tools 92a, 92b of the same type are disposed at another a plurality of positions in the circumferential direction such that the two second machining tools 92a, 92b are disposed apart from each other in the front/back direction Y. In the example in the drawings, eight first machining tools 90a, 90b and eight second machining tools 92a, 92b are disposed. In this way, maintainability can be enhanced as described below because replacing operations can be easily performed many times respectively for the first machining tools 90a, 90b and the second machining tools 92a, 92b.

Figure 6:
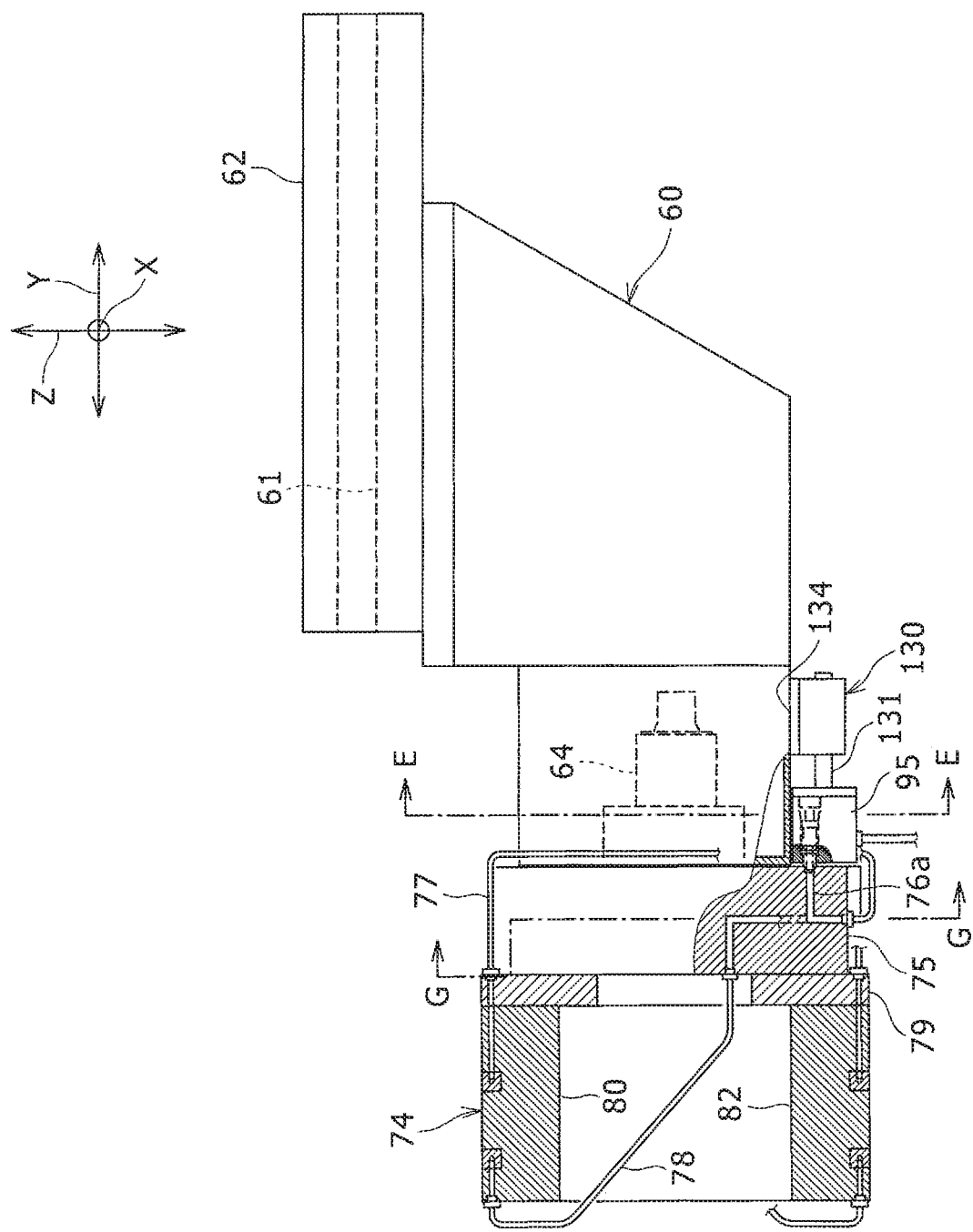
FIG. 6 is an enlarged view of a portion D in FIG. 3A with a partial cross-sectional view.
Figure 7:
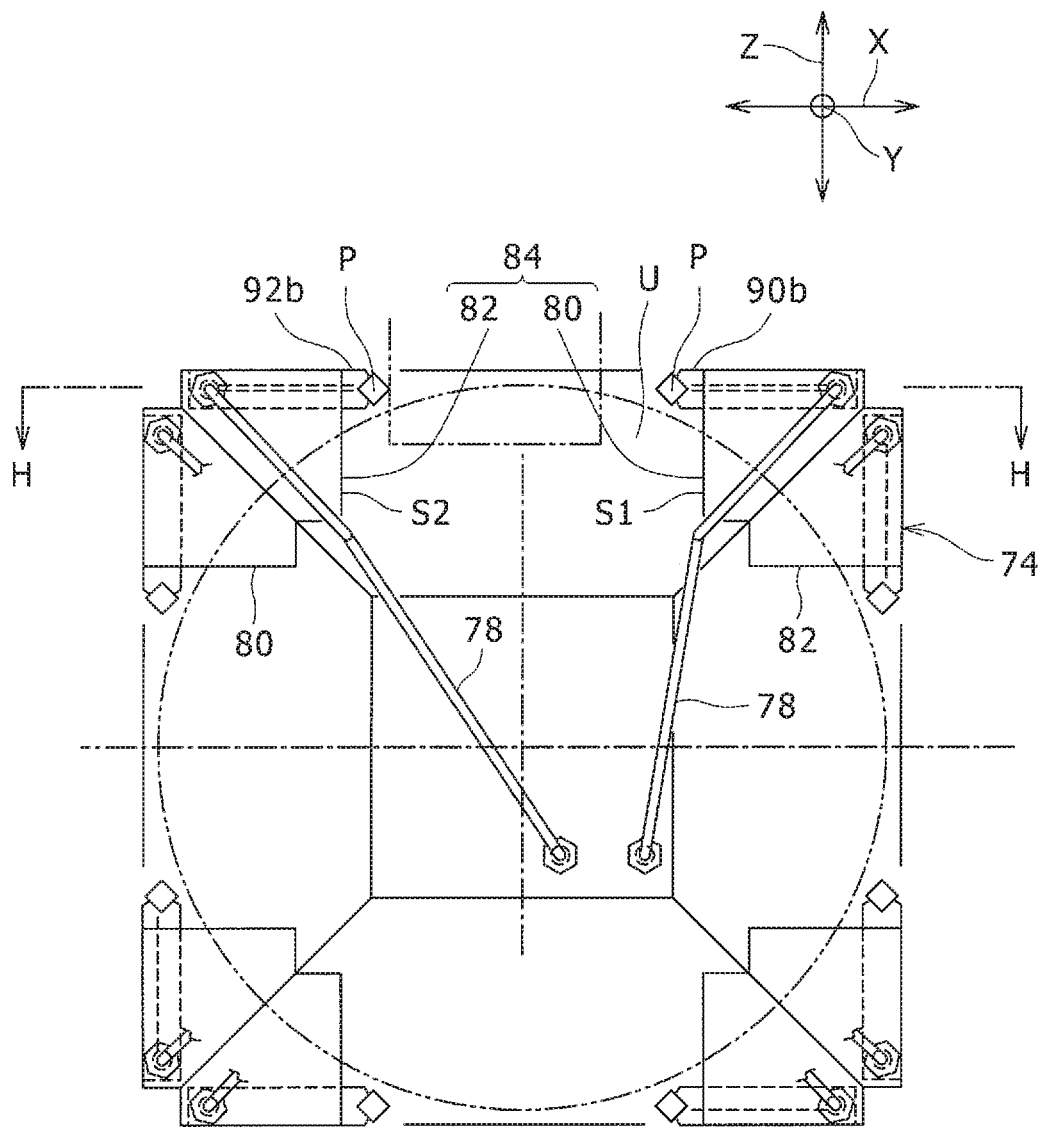
FIG. 7 is a diagram viewed from the left to the right in FIG. 6.
Figure 8A:
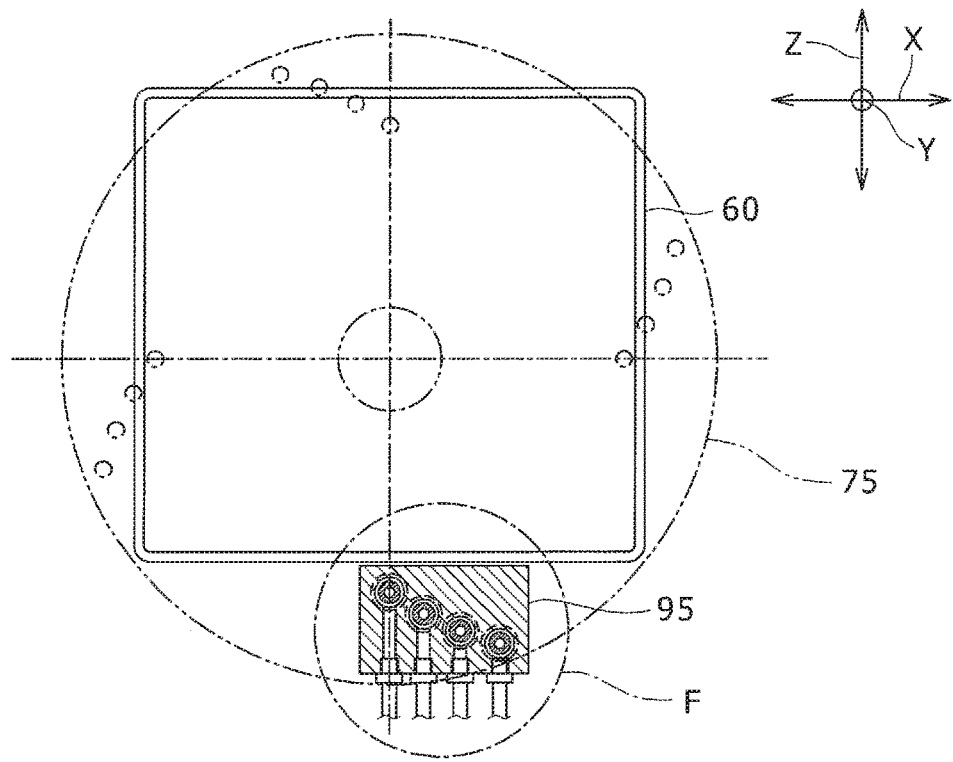
FIG. 8A is a cross-sectional view taken along the line E-E in FIG. 6.
Figure 8B:
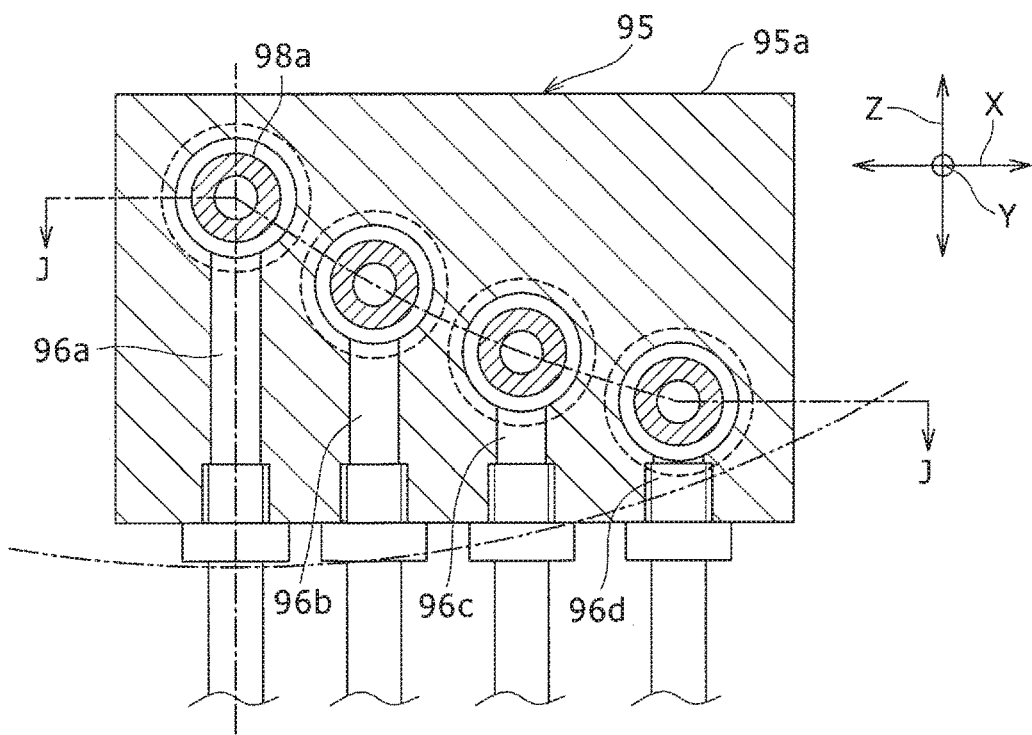
FIG. 8B is an enlarged view of a portion F in FIG. 8A.
Figure 9:
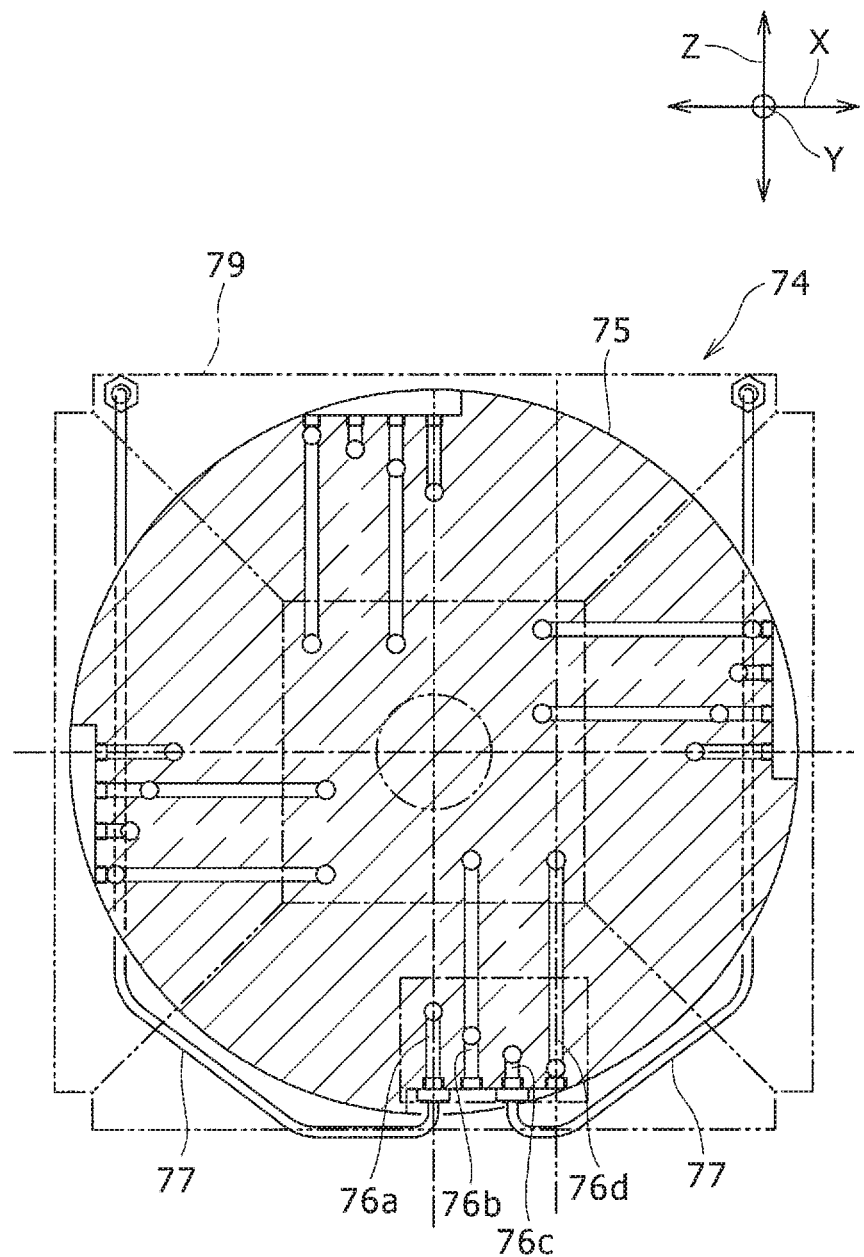
FIG. 9 is a cross-sectional view taken along the line G-G in FIG. 6.
Figure 10:
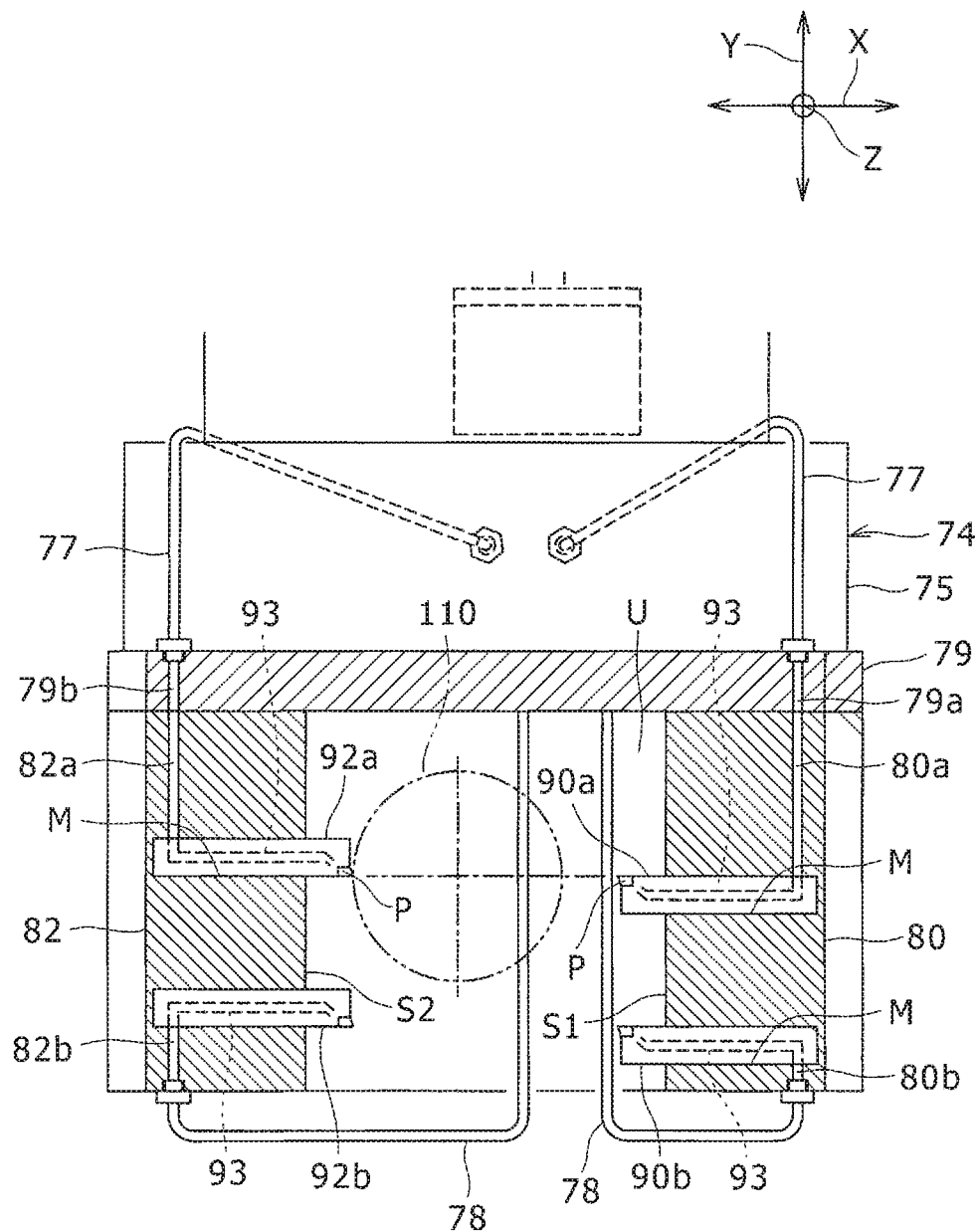
FIG. 10 is a cross-sectional view taken along the line H-H in FIG. 7.

With reference to FIG. 6 to FIG. 10, positional relationships between the turret 74 and the first machining tools 90a, 90b and the second machining tools 92a, 92b are specifically described. FIG. 6 is an enlarged view of the portion D shown in FIG. 3A with a partial cross-sectional view. FIG. 7 is a front view from the left side to the right side in FIG. 6. FIG. 8A is a cross-sectional view taken along the line E-E in FIG. 6. FIG. 8B is an enlarged view of a portion F in FIG. 8A. FIG. 9 is a cross-sectional view taken along the line G-G in FIG. 6. FIG. 10 is a cross-sectional view taken along the line H-H in FIG. 7.

The turret 74 includes a disc-shaped turret body 75, a holder mounting base 79 having a square frame shape which is secured on a front surface of the turret body 75, four first tool holders 80, and four second tool holders 82.

The four first tool holders 80 are respectively secured at the four corners on the front surface (the surface on the left in FIG. 3A) of the holder mounting base 79. The four second tool holders 82 are respectively secured next to the first tool holders 80 in the circumferential direction of the holder mounting base 79 at the four corner on the front surface of the holder mounting base 79. The first tool holders 80 and the second tool holders 82 have a triangular column shape such that these holders are symmetrical with respect to the planes radially extending towards the four corners of the holder mounting base 79. At the four positions in the circumferential direction of the turret 74, the first tool holders 80 and the second tool holders 82 face each other in parallel with a space U in the circumferential direction. A single tool mounting portion 84 includes a pair of the first tool holder 80 and the second tool holder 82 which are adjacent to each other with the space U therebetween. Accordingly, four of the tool mounting portions 84 are disposed at four positions in the circumferential direction of the turret 74. The turret 74 is rotatably supported by the turret carriage 60 about the axis in the front/back direction Y in a rotatably indexable manner.

The first machining tools 90a, 90b (FIG. 3B) are attached to the first tool holder 80 of each tool mounting portion 84 on a first side surface S1 (FIG. 7) facing the second tool holder 82 at two positions apart from each other in the front/back direction Y such that the first machining tools 90a, 90b protrude in the circumferential direction of the turret 74. In this way, as shown in FIG. 10, two grooves M are formed on the first side surface S1 to be apart from each other in the front/back direction Y. Each groove M also opens on the outer side surface of the turret 74. The first machining tools 90a, 90b are respectively secured in the grooves M such that the root side portions of the first machining tools 90a, 90b are inserted in the grooves M. Tip side portions of the first machining tools 90a, 90b respectively protrude from the grooves M which open on the first side surface S1. The first machining tools 90a, 90b apply a rough finishing process to an outer circumferential surface of the workpiece 110 (FIG. 1B). Each of the first machining tools 90a, 90b includes a cutting edge P secured at a tip portion. Although the first machining tool 90a and the first machining tool 90b are of the same type, these tools are referred to with different reference characters for convenience.

Similarly, the second machining tools 92a, 92b (FIG. 3B) are respectively attached to the second tool holder 82 of each tool mounting portion 84 on a second side surface S2 (FIG. 7) facing the first tool holder 80 at two positions apart from each other in the front/back direction Y such that the second machining tools 92a, 92b protrude in the circumferential direction. Similarly to the first machining tools 90a, 90b, the second machining tools 92a, 92b are respectively inserted and secured in the grooves M formed on the second side surface S2 such that the tip side portions protrude from the second side surface S2 side. The second machining tools 92a, 92b cut annular grooves 102 (FIG. 1B) at an upper end portion of the workpiece 110 (FIG. 1B). A cutting edge P is secured at a tip portion. In this way, at each of the tool mounting portions 84, the two second machining tools 92a, 92b are disposed to be apart from the two first machining tools 90a, 90b in the circumferential direction of the turret 74. Although the second machining tool 92a and the second machining tool 92b are of the same type, these tools are referred to with different reference characters for convenience.

As shown in FIG. 6, FIG. 8A, and FIG. 8B, a flow passage connection unit 95 including four first oil supply passages 96a, 96b, 96c, 96d is secured below the turret carriage 60.

Figure 11:
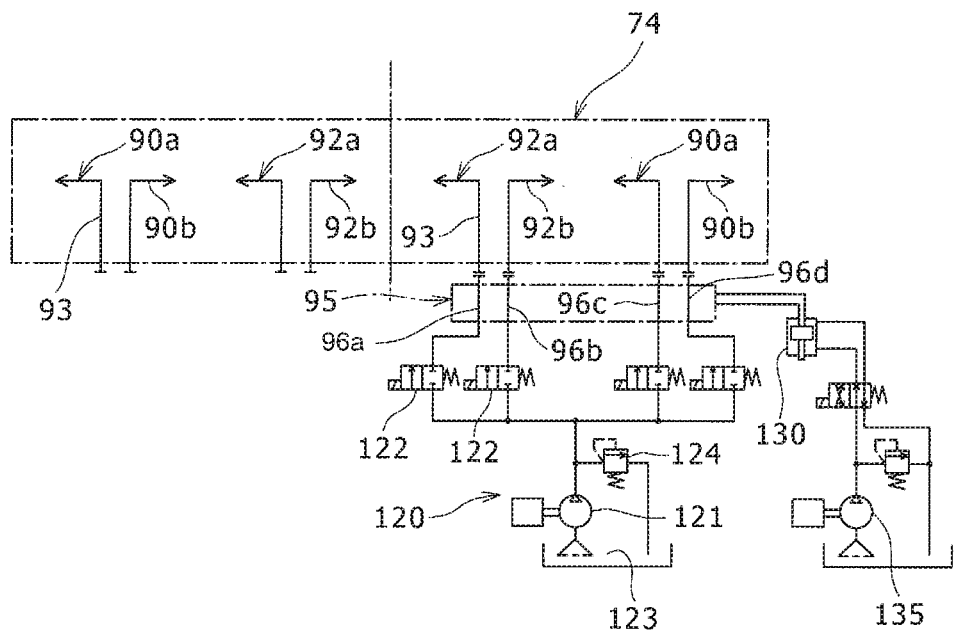
FIG. 11 is a diagram showing a hydraulic circuit for supplying a cutting oil agent to a plurality of machining tools.

FIG. 11 shows a hydraulic circuit for supplying a cutting oil agent to the machining tools 90a, 90b, 92a, 92b. The four first oil supply passages 96a, 96b, 96c, 96d are respectively connected to a high pressure oil supply pump 121 of a high pressure coolant unit 120 via electromagnetic on/off valves 122. For each of the machining tools 90a, 90b, 92a, 92b, a tool-side oil passage 93 connected to the first oil supply passages 96a, 96b, 96c, 96d is formed. The machining tools 90a, 90b, 92a, 92b are structured to be capable of ejecting the cutting oil agent (coolant liquid) towards the cutting edge P from the tool-side oil passages 93 at a high pressure. In this way, it becomes possible, as described below, to enhance abrasion resistance of the cutting edge P by suppressing heat during machining, and to prevent chips from becoming entangled with other ambient parts by making chips to be easily broken. The high pressure coolant unit 120 includes a high pressure oil supply pump 121 and electromagnetic on/off valves 122, and also an oil tank 123 and a relief valve 124, both of which are described below.

Specifically, as shown in FIG. 6, FIG. 8A, and FIG. 8B, the flow passage connection unit 95 is attached on a lower surface of the turret carriage 60. The flow passage connection unit 95 may be referred to as "piston holder".

Figure 12:
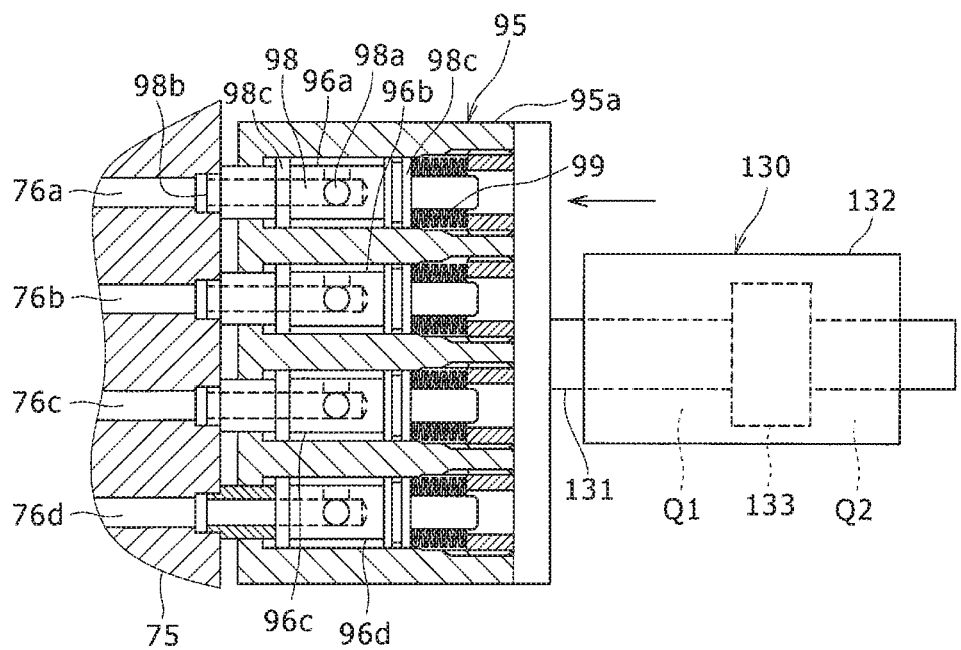
FIG. 12 is a cross-sectional view taken along the line J-J in FIG. 8B.
Figure 13:
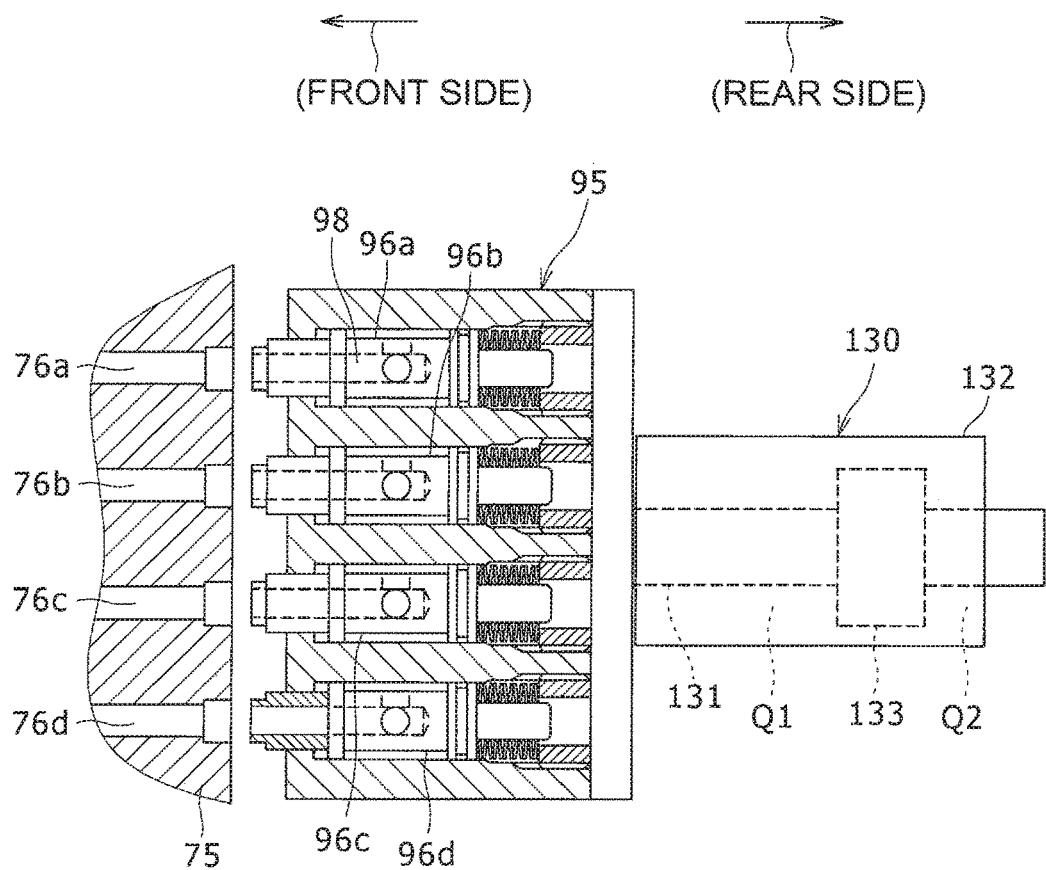
FIG. 13 is a diagram corresponding to FIG. 12 when a turret starts rotation for indexing.

FIG. 12 is a cross-sectional view taken along the line J-J in FIG. 8B. Corresponding to FIG. 12, FIG. 13 is a view when the turret 74 starts rotation for indexing.

The flow passage connection unit 95 is structured to include a block 95a which includes the four first oil supply passages 96a, 96b, 96c, 96d and four oil passage pistons 98 respectively disposed for the first oil supply passages 96a, 96b, 96c, 96d. The first oil supply passages 96a, 96b, 96c, 96d may be collectively referred to as "first oil supply passages 96". As shown in FIG. 8B and FIG. 12, each of a first end side of the first oil supply passages 96 extends in the vertical direction Z and opens at the bottom surface of the block 95a, whereas a second end side of the first oil supply passage 96 extends in the front/back direction Y (the horizontal direction in FIG. 12) and opens at the front side surface (the left surface in FIG. 12) of the block 95a. As shown in FIG. 8B, the lengths of first end side portions of the four first oil supply passages 96 in the vertical direction Z become shorter in turn from the first oil supply passage 96a on one end (leftmost in FIG. 8B) in the lateral direction X to the first oil supply passage 96d on the other end (rightmost in FIG. 8B).

As shown in FIG. 12, each of the four oil passage pistons 98 includes an internal oil passage 98a which is disposed at the second end side portion of each of the first oil supply passages 96. A protrusion portion 98b which protrudes from the front side surface of the block 95a is formed at a front end portion of the oil passage piston 98. At one end, the internal oil passage 98a communicates with the first oil supply passages 96 at an outer circumferential surface of the oil passage piston 98 on the rear end side (right end side in FIG. 12). At the other end, the internal oil passage 98a opens at the front end surface of the protrusion portion 98b. Two flanges 98c are respectively disposed at two positions around the outer circumferential surface of the oil passage piston 98. The internal oil passage 98a communicates with the first oil supply passages 96 through an opening on the outer circumferential surface having a smaller diameter between the two flanges 98c. A spring 99 is disposed between the rear end portion of the oil passage piston 98 and a rear end portion of the block 95a to secure the connection to the intermediate oil supply passages 76a, 76b, 76c, 76d described below by suppressing positional deviation of the oil passage pistons 98. Each oil passage piston 98 may include a plurality of portions separable from each other in the front/back direction, which is the axis direction of the oil passage piston 98.

As shown in FIG. 11, one end of each of the first oil supply passages 96 of the flow passage connection unit 95 is connected to each of the electromagnetic on/off valves 122. The electromagnetic on/off valves 122 switch between allowing and preventing a flow of the cutting oil agent by powering or not powering electromagnetic solenoids such that of the machining tools 90a, 90b, 92a, 92b, the cutting oil agent is supplied only to the cutting edge P which is being used for machining.

As shown in FIG. 12 and FIG. 13, a rod 131 of a double-acting hydraulic cylinder unit 130 is secured at the rear end (the right end portion in FIG. 12 and FIG. 13) of the block 95a of the flow passage connection unit 95 on the opposite side of the turret 74.

The double-acting hydraulic cylinder unit 130 includes a piston 133 which is slidably disposed inside a cylindrical member 132 and a rod 131 which is attached to the piston 133. As shown in FIG. 6, the cylindrical member 132 is supported to be movable in the front/back direction Y by a cylinder guide rail 134 below the turret carriage 60. Pressurized oil is supplied into one of the hydraulic chambers Q1 and Q2 on both sides of the piston 133 inside the cylindrical member 132 from an oil supply pump 135 (FIG. 11), and is exhausted from the other chamber. In this way, the tip of the rod 131 can be reciprocated in the front/back direction Y.

As shown in FIG. 12, the block 95a of the flow passage connection unit 95 moves forward as the tip of the rod 131 moves toward the front side. As shown in FIG. 13, the block 95a moves backward as the tip of the rod 131 moves toward the rear side. In this way, the turret 74 (FIG. 6) can be smoothly rotated as described below. The movement of the tip of the rod 131 is controlled by a control panel 140 (FIG. 2 and FIG. 3A) described below.

The electromagnetic on/off valves 122 shown in FIG. 11 are connected to an outlet port of the high pressure oil supply pump 121 on the opposite side of the flow passage connection unit 95. An inlet port of the high pressure oil supply pump 121 is connected to the oil tank 123 of the high pressure coolant unit 120.

As shown in FIG. 6 and FIG. 9, the intermediate oil supply passages 76a, 76b, 76c, 76d are formed inside the turret body 75. Four groups of the intermediate oil supply passages 76a, 76b, 76c, 76d are respectively disposed at four positions displaced 90 degrees with respect to each other in the circumferential direction of the turret body 75. Because the shapes and positions of the four groups of the intermediate oil supply passages 76a, 76b, 76c, 76d are identical when rotated 90 degrees, one group of the intermediate oil supply passages 76a, 76b, 76c, 76d at the lower end in FIG. 9 is described as a representative.

In the description below, each of the intermediate oil supply passages 76a, 76b, 76c, 76d in the one group may be referred to a first oil passage 76a, a second oil passage 76b, a third oil passage 76c, and a fourth oil passage 76d in turn from the left side to the right side. Each of the first oil passage 76a and the third oil passage 76c has an upstream portion extending in the front/back direction Y such that the upstream end of the upstream portion opens at a rear surface of the turret body 75, and a downstream portion extending in the vertical direction Z such that the downstream end opens at a lower surface of the turret body 75.

The downstream ends of the first oil passage 76a and the third oil passage 76c are respectively connected, at both ends in the lateral direction X at a top end portion of the holder mounting base 79, to second oil supply passages 79a, 79b (FIG. 10) of the holder mounting base 79 via first intermediate pipes 77 passing outside the turret body 75. As shown in FIG. 10, the second oil supply passage 79a connected to the third oil passage 76c (FIG. 9) is connected to a third oil supply passage 80a of the first tool holder 80. The third oil supply passage 80a is connected to the tool-side oil passage 93 of the first machining tool 90a on the rear side (upper side of FIG. 10) out of the two first machining tools 90a, 90b.

The second oil supply passage 79b connected to the first oil passage 76a (FIG. 9) is connected to a third oil supply passage 82a of the second tool holder 82. The third oil supply passage 82a is connected to the tool-side oil passage 93 of the second machining tool 92a on the rear side out of the two second machining tools 92a, 92b.

Returning to FIG. 6 and FIG. 9, each of the second oil passage 76b and the fourth oil passage 76d has an upstream portion extending in the front/back direction Y such that the upstream end of the upstream portion opens at a rear surface of the turret body 75, whereas the downstream end opens at a front surface (the left side surface in FIG. 6) of the turret body 75. In each of the second oil passage 76b and the fourth oil passage 76d, the upstream portion and a downstream portion extending in the front/back direction Y are connected to each other via an intermediate portion in the flow direction extending in the vertical direction Z. In FIG. 9, the bottom ends of the portions of second oil passage 76b and fourth oil passage 76d extending in the vertical direction Z are closed.

The downstream ends of the second oil passage 76b and the fourth oil passage 76d are respectively connected to the second intermediate pipes 78 at the front side surface of the turret body 75. The second intermediate pipes 78 pass through inside the holder mounting base 79 and the tool holders 80, 82 to be respectively connected to fourth oil supply passages 80b, 82b (FIG. 10) of the tool holders 80, 82 from the front side of the tool holders 80, 82 at upper end portions.

The fourth oil supply passage 80b of the first tool holder 80 is connected to the second oil passage 76b of the turret body 75 via the second intermediate pipe 78. The fourth oil supply passage 80b is connected to the tool-side oil passage 93 of the first machining tool 90b on the front side out of the two first machining tools 90a, 90b of the first tool holder 80.

The fourth oil supply passage 82b of the second tool holder 82 is connected to the fourth oil passage 76d of the turret body 75 via the second intermediate pipe 78. The fourth oil supply passage 82b is connected to the tool-side oil passage 93 of the second machining tool 92b on the front side out of the second machining tools 92a, 92b of the second tool holder 82.

As shown in FIG. 12, the protrusion portion 98b of each of the oil passage piston 98 is inserted into an opening end of each of the first oil passage 76a, the second oil passage 76b, the third oil passage 76c, and the fourth oil passage 76d which opens at the rear side surface of the turret body 75. In this way, the upstream end of each of the oil passages 76a, 76b, 76c, 76d is connected to the first oil supply passage 96 of the flow passage connection unit 95.

Returning to FIG. 11, an oil passage to a relief valve 124 is disposed between the outlet port of the high pressure oil supply pump 121 and one end of the first oil supply passage 96 of the flow passage connection unit 95. The relief valve 124 can adjust a pressure of the pressurized oil ejected from the tool-side oil passage 93 to a predetermined high pressure. Chips formed during machining can be easily broken by ejecting such high pressurized oil towards the cutting edge P of the machining tool.

Returning to FIGS. 2 and 3A, the control panel 140 is secured at an upper rear end portion of the base 12 of the vertical lathe 10. The control panel 140 controls operations of the lateral movement motor 16, the lifting/lowering motor 22, the main spindle drive motor 49, the forward/backward movement motor 70, the indexing motor 64, and each of the electromagnetic on/off valves 122. The control panel 140 includes an arithmetic circuit, a storage, and an operation unit which is operated by a user. The control panel 140 controls operations of the vertical lathe 10 in accordance with operations through the operation unit.

The control panel 140 controls the movement of the tip of the rod 131 of the double-acting hydraulic cylinder unit 130 by controlling the supply and discharge of the pressurized oil to and from the double-acting hydraulic cylinder unit 130. In this way, the movement of the flow passage connection unit 95 is controlled. Specifically, as shown in FIG. 13, when the turret 74 (FIG. 6 and FIG. 7) starts rotation for indexing, the control panel 140 switches the supply and discharge of the pressurized oil to and from the double-acting hydraulic cylinder unit to move the rod 131 towards the rear side, which is the opposite side of the turret 74. In this way, when the turret 74 rotates, the protrusion portion 98b of the oil passage piston 98 of the flow passage connection unit 95 moves away from the turret body 75 of the turret 74 such that the rotation is not impeded by the protrusion portion 98b, achieving a smooth rotation.

In contrast, as shown in FIG. 12, when the rotation of the turret 74 is finished, the control panel 140 switches the supply and discharge of the pressurized oil to and from the double-acting hydraulic cylinder unit to move the rod 131 towards the front side, which is on the turret 74 side. In this way, the flow passage connection unit 95 is coupled with the turret 74 enabling supply of cutting oil to the cutting edge P.

As shown in FIG. 1A and FIG. 3A, a coolant collector 142 is disposed below the base 12 at a center position in the lateral direction X. The coolant collector 142 collects the cutting oil agent which has been ejected towards the machining target portion of the workpiece 110 from the machining tools 90a, 90b, 92a, 92b during machining of the workpiece 110. The coolant collector 142 collects not only the cutting oil agent but also chips formed during machining. A front end portion of a conveyor belt 143 is inserted in a rear end portion (right end portion in FIG. 3A) of the coolant collector 142 to discharge chips outside from a rear end side of the conveyor belt 143.

A coolant cooler 144 (FIG. 2) is connected to the coolant collector 142. The coolant cooler 144 cools the cutting oil agent supplied from the coolant collector 142 by passing the cutting oil agent through a filter (not shown) and applying a thermal exchange with a coolant medium at an appropriate thermal exchanging portion. The coolant medium is, for example, water and air. The cutting oil agent cooled at the coolant cooler 144 is sucked by the high pressure oil supply pump 121 of the high pressure coolant unit 120 and returned to the flow passage connection unit 95 (FIG. 3A and FIG. 6).

As shown in FIG. 2, the vertical lathe 10 includes a main spindle cooler 145. The main spindle cooler 145 receives the cutting oil agent supplied from the coolant cooler 144 after cooling and supplies the cutting oil agent to a rotary supporting portion for the main spindle 46 of the headstock 40 to cool and lubricate the rotary supporting portion.

As shown in FIG. 1A and FIG. 2, a loading platform 146 is disposed in a front portion of a column portion 13b on the left in the lateral direction X of the base 12. An unloading platform 148 is disposed in a front portion of the column portion 13b on the right in the lateral direction X of the base 12. The loading platform 146 includes a first transport belt (not shown) which transports a workpiece 110 to be machined from a position apart from the vertical lathe 10 towards near the headstock 40. The unloading platform 148 includes a second transport belt (not shown) which transports a machined workpiece 110 from near the headstock 40 to a position apart from the vertical lathe 10. Before machining the workpiece 110, the workpiece chuck 48 of the headstock 40 is moved by driving the lateral movement motor 16 to directly above the workpiece 110 to be machined disposed on the loading platform 146. The workpiece chuck 48 is hereinafter referred to as "chuck 48".

Then, the chuck 48 is lowered to clamp the workpiece 110 to be machined and then lifted by driving the lifting/lowering motor 22. After the workpiece 110 is machined, the chuck 48 is moved towards the upper supporting portion 14 by driving the lateral movement motor 16 and the lifting/lowering motor 22 to move the machined workpiece 110 on the unloading platform 147. Then, the machined workpiece 110 is transported by the second transport belt.

Out of machining processes of the workpiece 110 using the vertical lathe 10 described above, described below is a rough finishing process of an outer circumferential surface of the workpiece 110 by the first machining tools 90a, 90b. In this case, the forward/backward movement motor 70 is driven to align, with the workpiece 110 in the front/back direction Y, the first machining tools 90a, 90b on the front or rear side of one of the tool mounting portions 84 at a top end portion of the turret 74. For example, in a case shown in FIG. 3A, the first machining tool 90a on the rear side is aligned with the workpiece in the front/back direction Y. While the workpiece 110 is rotated about an axis in the vertical direction Z by driving the main spindle drive motor 49, the workpiece 110 is lowered by driving the lifting/lowering motor 22 to be in contact with the cutting edge of the first machining tool 90a on the rear side. In this way, rough finishing is applied to the outer circumferential surface of the workpiece 110.

As shown in FIG. 4, when the first machining tool 90a on the rear side becomes unusable due to a chipped cutting edge, the turret 74 is moved towards the backward (the right side of FIG. 4) by driving the forward/backward movement motor 70. Then, the first machining tool 90b on the front side is used for machining of the workpiece 110. Because the first machining tools 90a, 90b used to machine the workpiece 110 can be replaced in the front/back direction Y, no manual replacing operation of an operator nor rotation of the turret 74 is necessary. When the first machining tools 90a, 90b on both sides in the depth Y become unusable, the turret 74 is rotatably indexed to use one of the first machining tools 90a, 90b of another tool mounting portion 84 for machining.

In order to groove the workpiece 110 using the second machining tools 92a, 92b, the forward/backward movement motor 70 is driven to align, with the workpiece 110, for example, the second machining tool 92a on the rear side in the front/back direction Y at one of the tool mounting portions 84. Then, the lateral movement motor 16 is driven to move the workpiece 110 at a position slightly shifted in the lateral direction X from the outer circumferential surface of the second machining tool 92a. The lifting/lowering motor 22 is subsequently driven to lower the workpiece 110 to the same position in the vertical direction Z as the second machining tool 92a. While the workpiece 110 is rotated about an axis in the vertical direction Z by driving the main spindle drive motor 49, the workpiece 110 is moved to be in contact with the cutting edge of the second machining tool 92a by driving the lateral movement motor 16 to groove the outer circumferential surface of the workpiece.

Similarly to the first machining tools 90a, 90b, when the second machining tool 92a becomes unusable, the turret 74 is moved backward and the second machining tools 92a, 92b for machining the workpiece 110 are replaced in the front/back direction Y. When the second machining tool 92b on the front side also becomes unusable after the replacement, the turret 74 is rotatably indexed to use one of the second machining tools 92a, 92b of another tool mounting portion 84. Although the tools on the rear sides are used first for machining in both of the first machining tools 90a, 90b and the second machining tools 92a, 92b in the above description, the tools on the front side may be used first instead.

According to the above vertical lathe 10, when it is necessary to replace the first machining tools 90a, 90b or the second machining tools 92a, 92b, the turret 74 is moved in the front/back direction Y by driving the forward/backward movement motor 70. In this way, the first machining tools 90a, 90b or the second machining tools 92a, 92b can be easily replaced with another tool. This enhances the maintainability, achieving higher performance.

In the above description, the forward/backward movement motor 70, the lateral movement motor 16, and the lifting/lowering motor 22 are electric motors which are driven to move units of the vertical lathe 10. However, in place of these motors 70, 16, 22, cylinder mechanisms may be used as actuators to change the amount of protrusion portion of the rod from the cylinder using air or hydraulic pressure to move portions of the vertical lathe.

Figure 14:
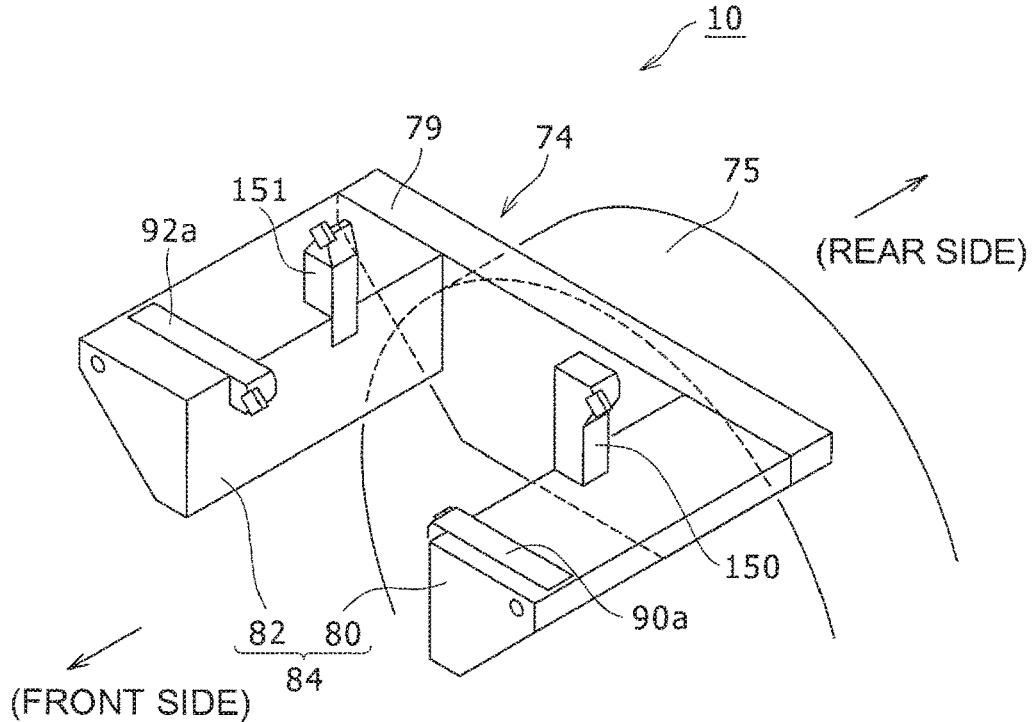
FIG. 14 is a diagram, corresponding to FIG. 3B, of a vertical lathe according to another embodiment of the present disclosure.

Corresponding to FIG. 3B, FIG. 14 shows a vertical lathe 10 according to another embodiment. In the structure shown in FIG. 1 and FIG. 13, the first machining tools 90a, 90b or the second machining tools 92a, 92b of the same type are disposed apart from each other in the front/back direction Y at the turret 74. In contrast, in the structure shown in FIG. 14, tools of different types are disposed on the front and rear sides in the front/back direction of the tool holders 80, 82 in all or some of the tool mounting portions 84.

Specifically, the first tool holder 80 includes the first machining tool 90a on the front side and a third machining tool 150 of a different type from the first machining tool 90a on the rear side. The second tool holder 82 includes the second machining tool 92a on the front side and a fourth machining tool 151 of a different type from the second machining tool 92a on the rear side.

The third machining tool 150 and the fourth machining tool 151 are both used to finish an internal circumferential surface of the workpiece 110 (FIG. 1A). With the tool mount portion 84 positioned at an upper end portion of the turret 74, the third machining tool 150 and the fourth machining tool 151 of the tool mount portion 84 are attached to the tool holders 80, 82 in a vertically extending manner. The third machining tool 150 is used for a rough semi-finish, whereas the fourth machining tool 151 is used for a fine final finish. When the third machining tool 150 is used for machining, the workpiece 110 is lowered or lifted by driving the lifting/lowering motor 22 to finish the internal circumferential surface, while the workpiece 110 is rotated by driving the main spindle drive motor 49.

Because the workpiece 110 can be machined by machining tools of wider varieties in the above structure, a higher performance of the vertical lathe 10 can be achieved. Other structures and operations are identical to those in FIG. 1 to FIG. 13.

Figure 16:
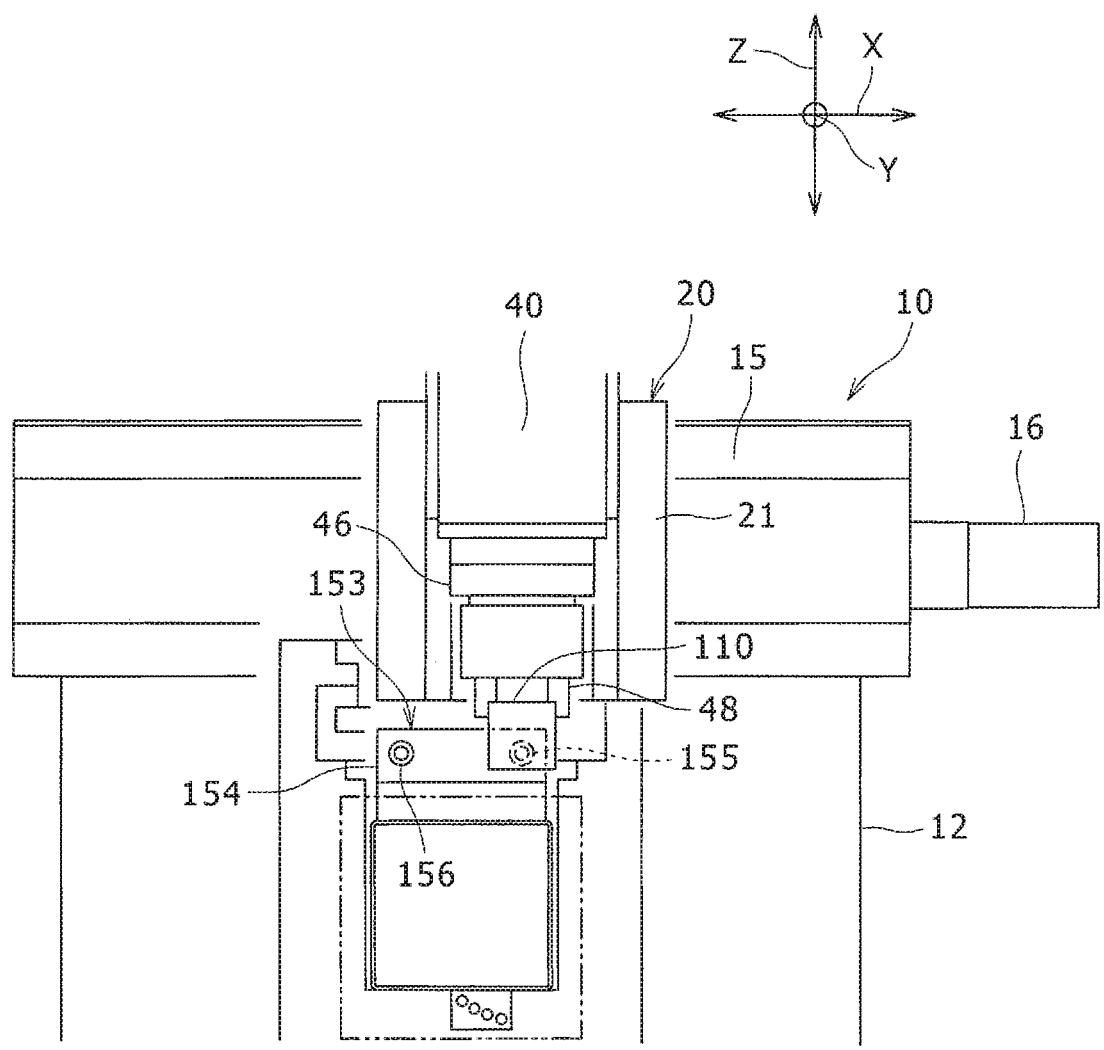
FIG. 16 is a cross-sectional view taken along the line K-K in FIG. 15C.

FIG. 15A to FIG. 15C are diagrams showing processes to punch the workpiece 110 in a vertical lathe 10 according to another embodiment having a structure to which a tool to punch the workpiece 110 is added, after machining of the outer circumferential surface of the workpiece 110. FIG. 16 is a cross section taken along the line K-K in FIG. 15C.

In the structure shown in FIG. 15A to FIG. 15C, a drill unit 153 is supported by the turret carriage 60 in the structure shown in FIG. 1 to FIG. 13. Near a top end portion of the turret carriage 60, the drill unit 153 includes a supporting member 154 which is supported movably in the front/back direction Y, a punch tool 155, and a deburring tool 156. As shown in FIG. 16, the punch tool 155 and the deburring tool 156 are attached side by side in the lateral direction X on the front side of the supporting member 154 such that the punch tool 155 and the deburring tool 156 extend in the front/back direction Y. The drill unit 153 is configured to be movable in the front/back direction Y with respect to the turret carriage 60 by driving a drill moving motor (not shown). The punch tool 155 and the deburring tool 156 are rotatably driven about axes in the front/back direction Y by respective motors (not shown).

As shown in FIG. 15A, the drill unit 153 is moved to a backward position with respect to the turret carriage 60 by driving the drill moving motor to avoid the drill unit 153 from interfering during machining of the outer circumferential surface of the workpiece 110. As shown in FIG. 15B, in a drilling preparation process, the workpiece 110 is lifted to a predetermined position by driving the lifting/lowering motor 22, and the turret carriage 60 is moved backward by driving the forward/backward movement motor 70. Then, the drill unit 153 is moved forward with respect to the turret carriage 60 by driving the drill moving motor such that a cutting edge of the punch tool 155 approaches the outer circumferential surface of the workpiece 110.

As shown in FIG. 15C, during drilling, the punch tool 155 is moved forward while being rotatably driven by moving the turret carriage 60 forward by driving the forward/backward movement motor 70. In this way, the workpiece 110 can be drilled. In machining using the deburring tool 156 (FIG. 16) having a drill bit shape, the portions are moved in a similar manner to the punch tool 155. In deburring, the deburring tool 156 is moved in the front/back direction Y to bring the cutting edge in contact with an end portion alone of an opening formed in the drilling so as to scrape burrs formed at the end portion. Through such a series of drilling, for example, a small hole 103 can be formed at a bottom portion of the annular groove 102 of the workpiece 110 shown in FIG. 1B. Other structures and operations are identical to those in FIG. 1 to FIG. 13.

Figure 17:
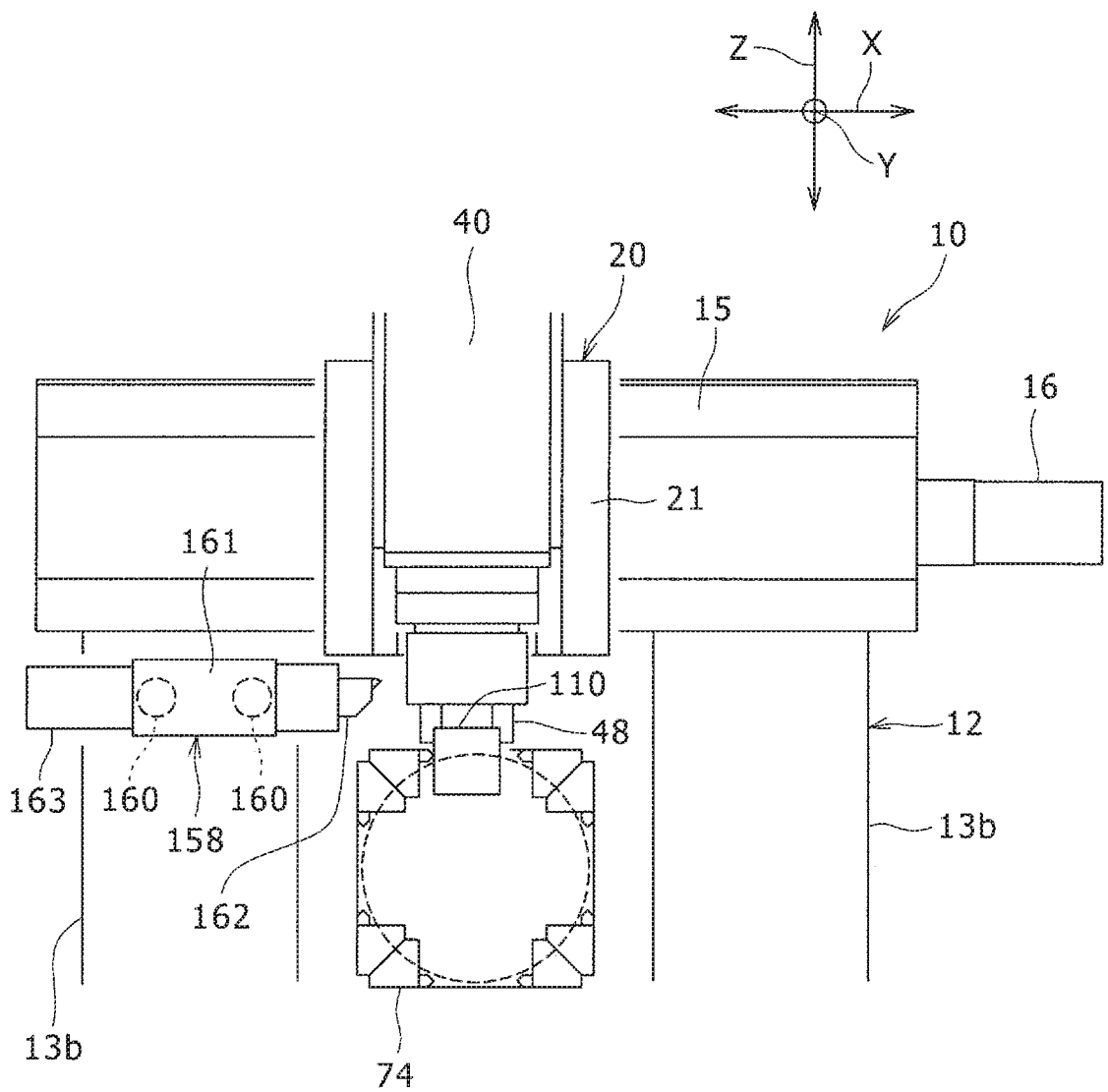
FIG. 17 is a front view showing a vertical lathe according to another embodiment of the present disclosure in a structure to which an oval machining tool is added to perform oval machining to an outer cylindrical circumferential surface of a workpiece, with some portions omitted.
Figure 19:
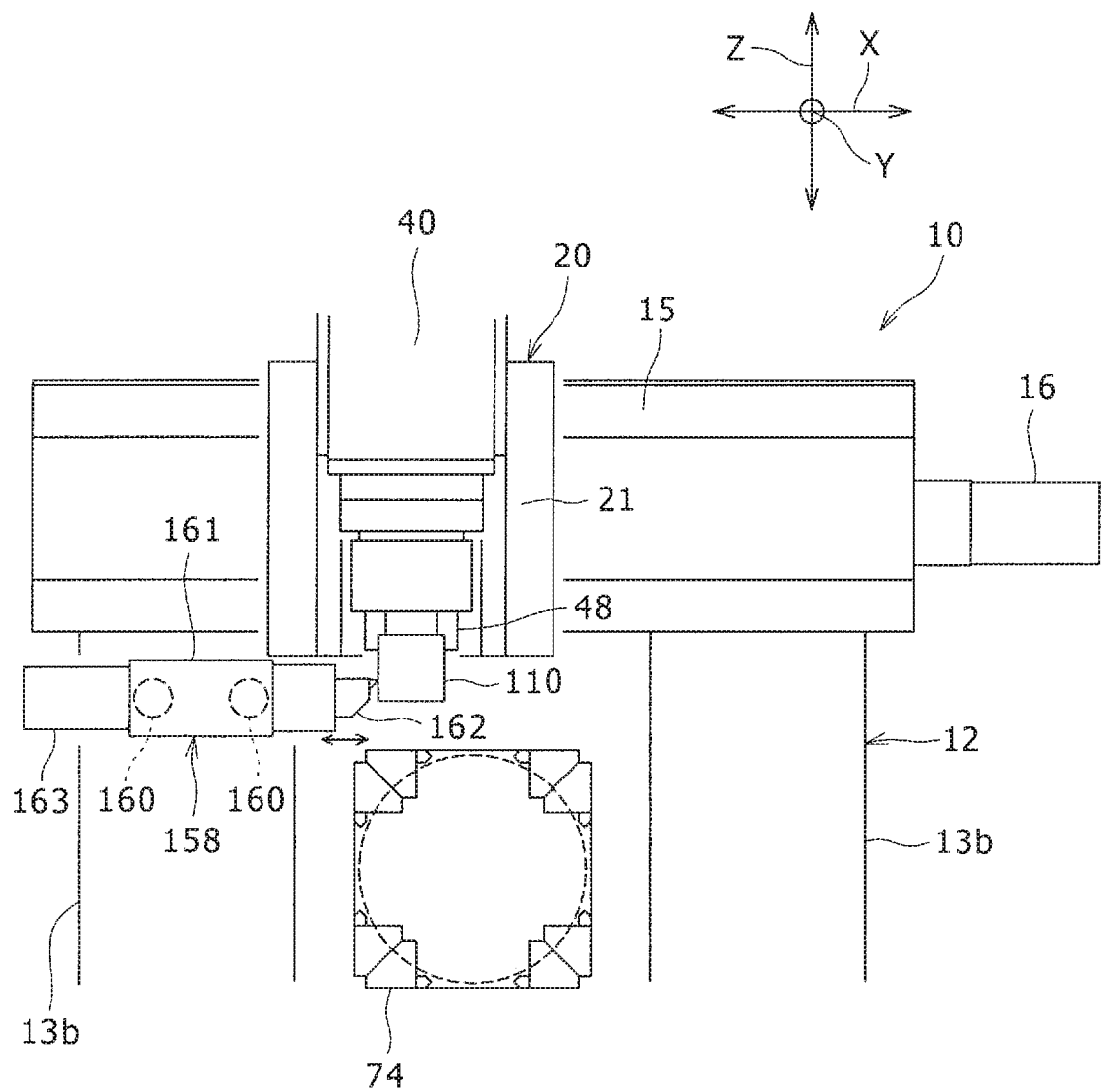
FIG. 19 is a diagram viewed from the left to the right in FIG. 18B.

FIG. 17 is a front view of a vertical lathe 10 according to yet another embodiment having a structure to which a tool to apply oval machining to the outer circumferential surface of a cylindrical workpiece 110 is added, with partial omission. FIG. 18 is a diagram showing processes to apply oval machining to the cylindrical outer circumferential surface of the workpiece 110 after groove finishing in the structure shown in FIG. 17. FIG. 19 shows a front view from the left side to the right side in FIG. 18B.

In the structure shown in FIG. 17, an oval machining unit 158 is supported below the first guide rails 15 at an upper portion of the column portion 13b which is on the left of the base 12 in the lateral direction X in the structure shown in FIG. 1 to FIG. 13. The oval machining unit 158 includes a hydraulic cylindrical member 159 (FIG. 18A and FIG. 18B) secured on the column portion 13b, two synchronous rods 160 positioned side by side in the hydraulic cylindrical member 159, and a machining body 161 attached to the tip portions of the rods 160. The machining body 161 includes a machining tool 162 having a cutting edge, and a second lateral movement motor 163 which moves the machining tool 162 in the lateral direction X.

As shown in FIG. 18A, during machining of the outer circumferential surface of the workpiece 110 such as grooving, the machining body 161 is retracted backwards from the workpiece 110 by moving the tips of the rods 160 backwards by switching the supply and discharge of pressurized oil to and from the hydraulic cylindrical member 159. Then, as shown in FIG. 18B, when the oval machining is performed, the workpiece 110 is lifted by driving the lifting/lowering motor 22 (FIG. 18A). Subsequently, the machining body 161 is moved forward to a predetermined position by moving the tips of the rods 160 forward by switching the supply and discharge of the pressurized oil to and from the hydraulic cylindrical member 159. Then, as shown in FIG. 19, the workpiece 110 is moved left in the lateral direction by driving the lateral movement motor 16 such that the cutting edge approaches the outer circumferential surface of the workpiece 110. Then, the moving distance of the cutting edge of the machining tool 162 in the lateral direction X by the second lateral movement motor 163 and the rotational angle of the workpiece 110 by the main spindle drive motor 49 are synchronized while the workpiece 110 is lowered by the lifting/lowering motor 22. In this way, the outer circumferential surface of the workpiece 110 is finished to have an oval cross section. In other words, oval machining is applied. Other structures and operations are identical to those in FIG. 1 to FIG. 13.

Figure 21:
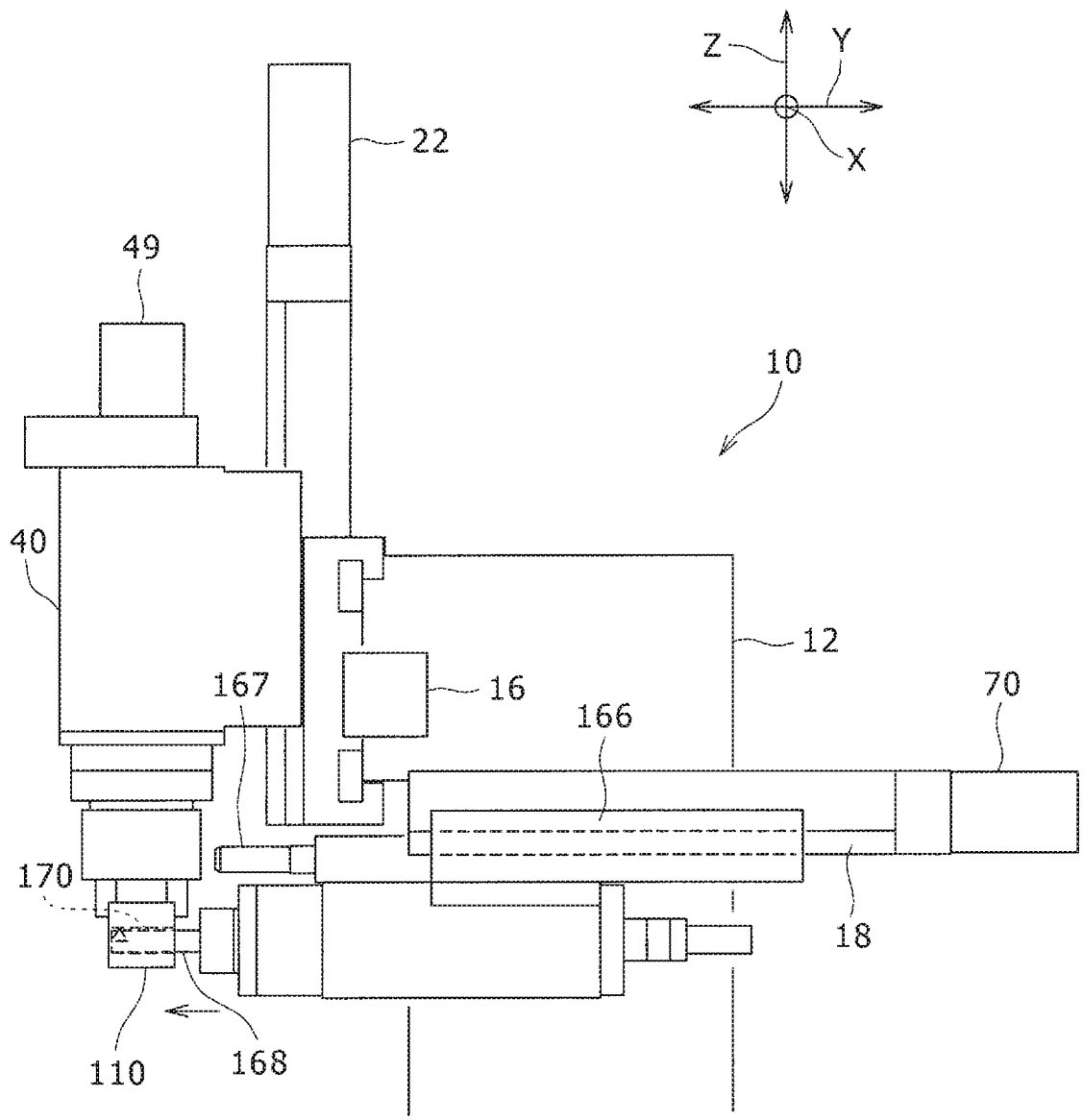
FIG. 21 is a diagram showing a finishing process in the structure shown in FIG. 20A to FIG. 20C.
Figure 22:
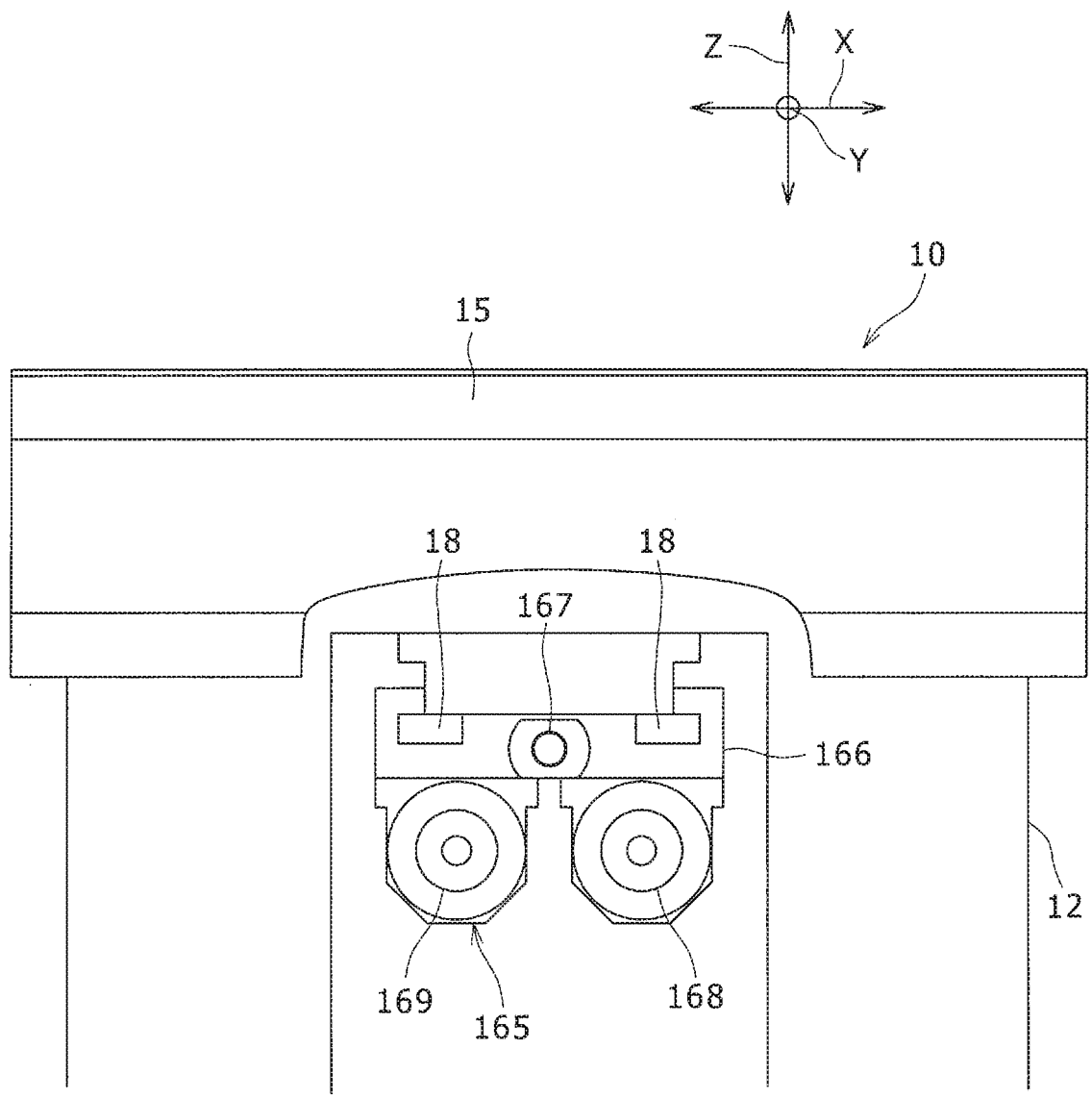
FIG. 22 is a cross-sectional view taken along the line L-L in FIG. 20A

FIG. 20A to FIG. 20C are diagrams showing positioning processes of a vertical lathe 10 according to another embodiment having a structure to which a pin hole machining unit 165 for finishing a pin hole 104 (FIG. 1B) of the workpiece 110 is added in place of the turret 74 (FIG. 1A). FIG. 21 is a diagram showing a finishing process in the structure shown in FIG. 20A to FIG. 20C. FIG. 22 is a cross sectional view taken along the line L-L in FIG. 20A.

In the structure shown in FIG. 20A to FIG. 20C, the pin hole machining unit 165 is hung at an upper portion of the base 12 in place of the turret carriage 60 (FIG. 3A) and the turret 74. The pin hole machining unit 165 includes a supporting member 166 which is supported by the third guide rails 18 to be movable in the front/back direction Y, a positioning bar 167, a first boring tool 168, and a second boring tool 169. The supporting member 166 is moved in the front/back direction Y by driving the forward/backward movement motor 70.

As shown in FIG. 22, the positioning bar 167 is supported in the supporting member 166 such that the positioning bar 167 protrudes forward at the center in the lateral direction X and is movable in the front/back direction Y with respect to the supporting member 166. The positioning bar 167 is moved in the front/back direction Y with respect to the supporting member 166 by a hydraulic cylinder mechanism (not shown). The positioning bar 167 has a cylindrical shape of the outer diameter at a tip portion substantially equal to the internal diameter of a pilot hole 170 of the pin hole of the workpiece 110 (FIG. 20).

The first boring tool 168 and the second boring tool 169 are secured side by side in the lateral direction X below the supporting member 166. The first boring tool 168 is for a semi-finish, whereas the second boring tool 169 is for a final finish. The boring tools 168, 169 are respectively rotatably driven by built-in motors (not shown).

To apply a finishing process to the pin hole, as shown in FIG. 20A, the lifting/lowering motor 22 is first driven to align the pilot hole 170, which has been formed in the workpiece 110 in advance, with the positioning bar 167 in the vertical position Z. Then, the positioning bar 167 is moved forward to be near to the outer circumferential surface of the workpiece 110 by the hydraulic cylinder mechanism. Next, as shown in FIG. 20B, the positioning bar 167 is moved forward to be inserted into the pilot hole 170 by driving the forward/backward movement motor 70. This completes the positioning of the workpiece 110. In this process, a gripping force of the chuck 48 on the workpiece 110 is slightly reduced such that the position of the workpiece 110 can be adjusted to the machining position along the positioning bar 167. Then, as shown in FIG. 20C, the gripping force of the chuck 48 is increased and the positioning bar 167 is retracted by driving the hydraulic cylindrical mechanism and the forward/backward movement motor 70. In that state, the workpiece 110 is moved to the right in the lateral direction X and also lowered in the direction Z to align the axis center of the pilot hole 170 with the axis center of the first boring tool 168.

Next, as shown in FIG. 21, with the positioning bar 167 kept at the retracted position, the supporting member 166 is moved forward by driving the forward/backward movement motor 70 and the first boring tool 168 is rotatably driven to apply a semi-finish to the internal surface of the pilot hole 170. This results in a pin hole before a final finish. After the semi-finish, the headstock 40 is moved to the left in the lateral direction X by driving the lateral movement motor 16 to align the axis center of the second boring tool 169 with the axis center of the pin hole. Then, similarly to the first boring tool 168, the second boring tool 169 applies final finishing process to the pin hole. Other structures and operations are identical to those in FIG. 1 to FIG. 13.

Although embodiments to perform the present disclosure are described above, the present disclosure is not limited to those embodiments in any manner. The present disclosure can of course be performed in a variety of embodiments in a scope not departing from the gist of the present disclosure.

The invention claimed is:
1. A vertical lathe comprising:
a base;
a headstock disposed above the base, the headstock being movable in a lateral direction and a vertical direction;
a main spindle rotatably supported about an axis in a vertical direction with respect to the headstock;
a workpiece chuck disposed at a lower end portion of the main spindle, the workpiece chuck detachably holding a workpiece;
a main spindle drive motor that rotatably drives the main spindle;
a turret carriage disposed to be movable with respect to the base in a front/back direction that is perpendicular to the lateral direction and the vertical direction;
an actuator secured on the base to move the turret carriage in the front/back direction;
a turret comprising a plurality of tool mounting portions disposed at a plurality of positions in a circumferential direction, the turret being supported by the turret carriage to be rotatably indexable about an axis in the front/back direction; and
a plurality of machining tools being attached apart from each other in the front/back direction at the plurality of tool mounting portions, wherein
the turret further comprises first tool holders secured at a plurality of positions in the circumferential direction on a front surface of a holder mounting base, and second tool holders secured at a plurality of positions in the circumferential direction on the front surface of the holder mounting base,
each of the plurality of tool mounting portions is formed of a pair of the first tool holder and the second tool holder arranged facing each other with a space in the circumferential direction of the turret,
as the plurality of machining tools, a plurality of first machining tools having first cutting edges secured at tip portions are attached to the first tool holder on a surface facing the second tool holder at positions apart from each other in the front/back direction, so that the plurality of first machining tools protrude in the circumferential direction of the turret, and
a plurality of second machining tools having second cutting edges secured at tip portions are attached to the second tool holder on a surface facing the first tool holder at positions apart from each other in the front/back direction, so that the plurality of second machining tools protrude in the circumferential direction of the turret.

2. The vertical lathe according to claim 1, wherein
the plurality of first machining tools attached apart from each other in the front/back direction at each of the tool mounting portions are of a single type.

3. The vertical lathe according to claim 2, wherein
the plurality of second machining tools attached apart from each other in the front/back direction at each of the tool mounting portions are of a single type.

4. The vertical lathe according to claim 1, wherein
the plurality of machining tools attached apart from each other in the front/back direction at each of the tool mounting portions are of different types.

5. The vertical lathe according to claim 1, wherein
the vertical lathe further comprises a flow passage connection unit that is secured on the turret carriage, the flow passage connection unit comprising a plurality of first oil supply passages, each of which is connected to a high pressure oil supply pump via an electromagnetic on/off valve,
the turret comprises a plurality of second oil supply passages that can be connected to an outlet port of each of the first oil supply passages when the turret is rotated,
the plurality of second oil supply passages are connected to tool-side oil passages that are formed in the plurality of machining tools, and
the vertical lathe is structured such that a cutting oil agent supplied from the high pressure oil supply pump side can be ejected from each of the tool-side oil passage towards a cutting edge of the machining tool in use for machining.

6. The vertical lathe according to claim 5, wherein the vertical lathe further comprises:
a hydraulic cylinder unit comprising a rod connected to the flow passage connection unit on the opposite side to the turret, and
a control panel that controls supply of hydraulic pressure to the hydraulic cylinder unit such that when the turret starts rotation, the rod of the hydraulic cylinder unit retracts to the opposite side to the turret, whereas when the turret finishes rotation, the rod moves forwards to a turret side.

* * * * *